United States Patent [19]

Holland

[11] 4,288,852

[45] Sep. 8, 1981

[54] METHOD AND APPARATUS FOR AUTOMATICALLY DETERMINING SHEET METAL STRAIN

[75] Inventor: Steven W. Holland, Rochester, Mich.

[73] Assignee: General Motors Corporation, Detroit, Mich.

[21] Appl. No.: 98,260

[22] Filed: Nov. 28, 1979

[51] Int. Cl.³ .................... G06K 9/36; G06F 15/20
[52] U.S. Cl. .................... 364/508; 364/515; 340/146.3 AC
[58] Field of Search .............. 364/508, 507, 515, 570, 364/300, 490, 488, 489, 491; 73/760, 783; 340/146.3 AH, 146.3 AC

[56] References Cited

U.S. PATENT DOCUMENTS

| | | | |
|---|---|---|---|
| 3,370,492 | 2/1968 | Treff | 364/475 X |
| 3,976,827 | 8/1976 | Alien et al. | 364/515 |
| 4,041,286 | 8/1977 | Sanford | 364/579 X |
| 4,163,212 | 7/1979 | Buerger et al. | 364/490 X |
| 4,223,387 | 9/1980 | Danielsson et al. | 364/489 X |

OTHER PUBLICATIONS

The Forming of Sheet Metal; S. S. Hecker & A. K. Ghosh, Scientific American, Nov. 1976, vol. 235, No. 5, pp. 100–108.

Primary Examiner—Edward J. Wise
Attorney, Agent, or Firm—Albert F. Duke

[57] ABSTRACT

Disclosed is a method and apparatus for automatic measurement of strain in a formed sheet metal sample. Prior to the forming operation, a grid of circles is imprinted on the sample and during the forming operation the circles are stretched to ellipses. The formed sample is exposed to an instrumentation camera and a digitized image of the pattern on the sample is stored in a digital computer. The computer is programmed to segment the image to distinguish the elliptical patterns from the background; to extract boundary points on an elliptical pattern and fit these points to an ellipse. Strain is determined as a function of the diameters of the fitted ellipse as well as the chord lengths of the actual pattern along the axes of the fitted ellipse.

5 Claims, 4 Drawing Figures

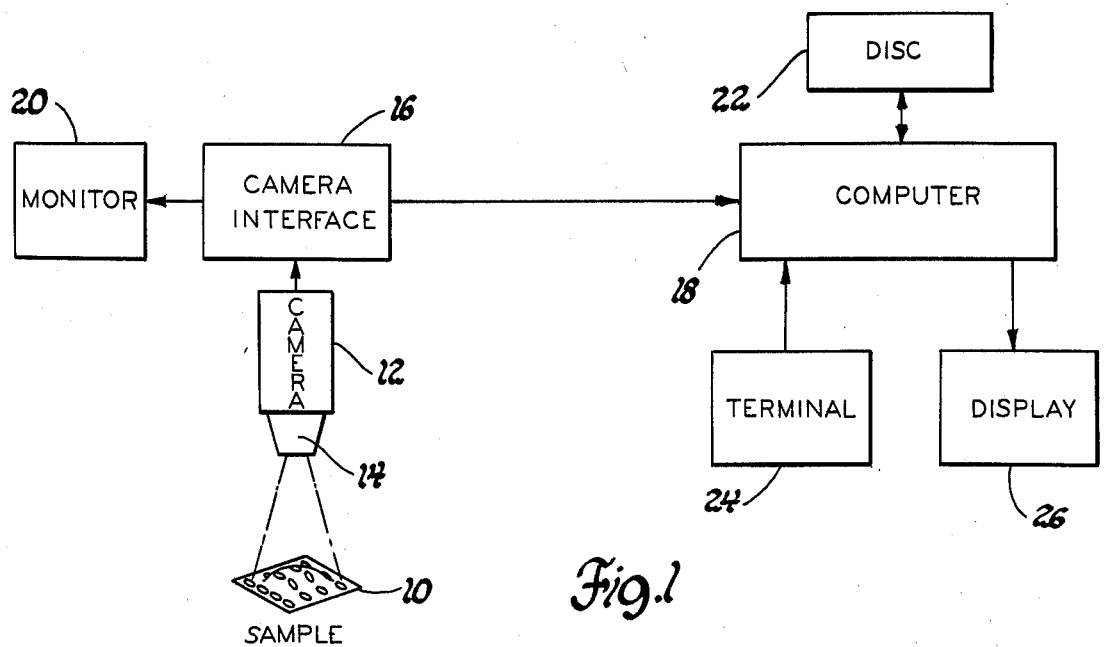
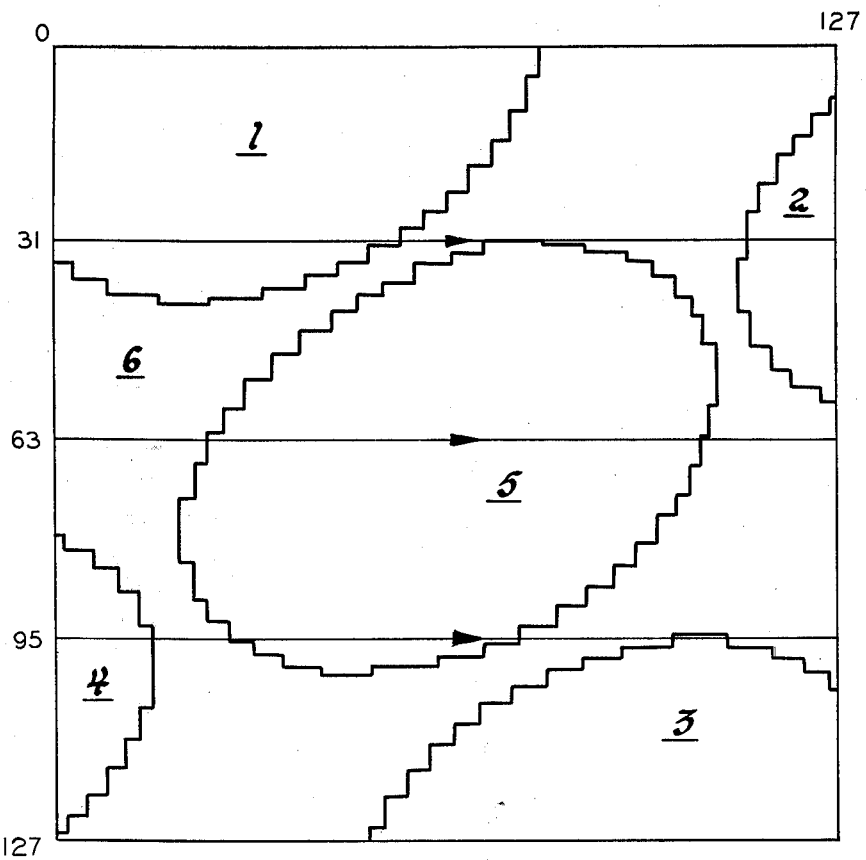
Fig.1
Fig.2

METHOD AND APPARATUS FOR AUTOMATICALLY DETERMINING SHEET METAL STRAIN

FIELD OF THE INVENTION

This invention relates to sheet metal strain measurement and, more particularly, to a method and apparatus for automating the measurement of strain in formed sheet metal.

BACKGROUND OF THE INVENTION

Industry in general, and the automobile industry in particular, produces a large number of stamped sheet metal parts each year. With the greatly increased usage of the new lighter weight and higher strength alloys, the problems of producing such parts have become aggravated. The design of stamping dies is largely an art and the considerable body of experience relative to dies for stamping steel is not readily applied in connection with the newer materials. The high cost incurred in acquiring the needed information by the trial and error methods of die design necessitates a different approach. One promising approach is to develop a better understanding of the stamping process itself. A measurement frequently required in stamping studies is the amount of strain present in the metal at various locations. In addition to supporting research efforts to understand the metal forming process and die design, strain measurements are also useful as an inspection aid. The strength of metals can be correlated with the amount of strain. The maximum strain in critical parts can also be checked to determine how close they are to the failure strain.

The standard technique employed to record strain measurements is carried out as follows. Sheet stock is printed with grids of small circles prior to a forming operation. As the metal is formed, the circles stretch into ellipses in proportion to the strain. Because the circles were printed in a known size, it is possible to calculate the strain by measuring the dimensions of the ellipse patterns. The circles can be printed in a variety of sizes and configurations using a variety of printing methods. They may be printed as open rings or filled-in dots. Two commonly employed printing methods are the photo-resist and electro-etch techniques.

The measurement of many small ellipses is a very labor intensive operation. For quick, approximate measurements, a clear plastic mask is held over the sample and slid along the sample to match up the appropriate dimensions. If greater precision is required, the samples to be measured are cut into pieces which can be laid on a calibrated toolmaker's microscope stage. The microscope stage is fitted with a digital position read-out indicating the amount of stage translation. The grid circle to be measured is aligned along one of the table axes with one side centered beneath a cross hair. The position counter is then zeroed and the stage moved until the opposite side is aligned beneath the cross hair. The display then indicates the ellipse measurement in some arbitrary units. This method is currently being used and produces good results. Readings have been found to be accurate to plus or minus 0.3 percent of the true strain value. The measurement does, however, involve some subjectivity in deciding where the pattern edge lies and in precisely orienting the pattern along one of the principle axes. This is difficult to achieve in severe cases where the pattern is degraded due to the stamping process and also when the strain levels are low. A skilled technician requires approximately one to two minutes for each point measured. This technique normally requires two similar measurements—once for the major axis strain and again for the minor axis strain. When many points must be measured, it becomes a very tedious time consuming operation.

SUMMARY OF THE INVENTION

With the foregoing in mind, it is an object of the present invention to overcome both the speed and accuracy limitations of the manual methods of measuring surface strains in sheet metal resulting from a forming operation.

In accordance with the present invention, a solid-stage instrumentation camera is used to record a picture of the sheet metal surface containing an elliptical pattern to be measured. The picture is digitized as a square array of light intensity values and stored in the memory of a digital computer. The computer is programmed to determine a gradient-weighted average light intensity of the picture for use as a threshold level below which everything in the picture can be considered black. Once the threshold level has been selected for the picture, the image is segmented into solid black (pattern) and solid white (background) regions and those regions which touch the border of the image are dismissed from further consideration. For a typical field of view all but one pattern will be eliminated. Points on the boundary of the remaining pattern are extracted and fitted to an ellipse. Once an acceptable fit is attained, the major and minor strain is computed from the fitted ellipse diameters and also from a chord measurement operation which measures the dimensions of the actual elliptical pattern rather than the dimensions of the fitted ellipse.

A more complete understanding of the present invention may be had from the following detailed description which should be read in conjunction with the drawings, in which:

BRIEF DESCRIPTION OF THE DRAWINGS

FIG. 1 shows the apparatus of the present invention;

FIGS. 2 and 3 are a pictorial representation useful in describing the threshold selection process; and FIG. 4 is an overall flow chart of the program executed by the computer.

DESCRIPTION OF THE PREFERRED EMBODIMENT

Figures 3, 4:
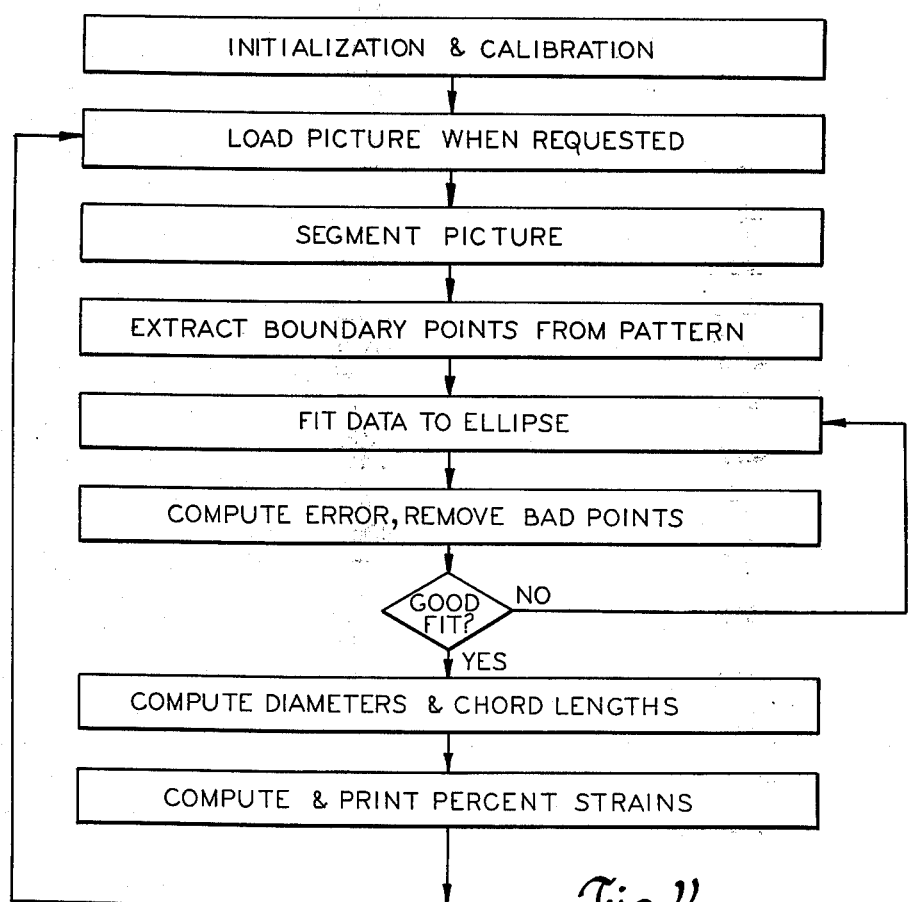

Referring now to the drawings and initially to FIG. 1, the sample generally designated 10 for which the strain is to be measured may be an actual sheet metal stamping or a test specimen stretched on a special press or pulled on a tensile test machine. Prior to the forming operation the sample is imprinted with a grid of circles of predetermined diameter. A commonly used circle size is 2.54 mm diameter. The technique selected to print the grid of circles onto the sheet stock depends on the type of material and the severity of the stamping operation. Preferably, the technique utilized produces a high contrast pattern which adheres well to the deforming surface while not altering the material properties. The pattern masks are normally generated on a film by a computer. One printing technique in use on steel samples is the photo-resist method, which provides excellent contrast between the patterned and non-patterned surface areas.

The sample is mounted in a fixture (not shown) similar to a microscope stage set-up. A camera indicated at 12 may be attached to an upright pole of the fixture on an adjustable slide or the camera may be a portable hand held unit. Preferably, the camera 12 is a solid state instrumentation camera whose sensing elements cover a square rather than rectangular area in the image. This permits the width of a single picture element (pixel) to be used as a convenient distance measure. Similarly, the area of a single picture element is a convenient unit of area. A suitable camera is the General Electric TN-2200 which contains a 128×128 matrix of C.I.D. (charge injection device) light sensing elements. The lens employed depends on the viewing area desired. For the standard grid spacing of 2.54 mm center-to-center distance, a 50 mm lens with 60 mm of extension tube has been found to work well. To ensure that the pattern will be accurately and unambiguously located in the recorded image, a high constrast image is required, i.e., one in which the pattern on the metal surface appears much darker (or much lighter) than the background. This in turn is dependent on the type and intensity of light utilized. The lighting source should be diffused and directed so as to minimize glare. One lighting arrangement which has been used successfully employs a fluorescent ring 14 placed around the lens itself. By keeping the camera integration period around 1/30th of a second, the flicker from the fluorescent ring does not interfere with the recording.

The lens of the camera 12 focuses the image of a portion of the sample including at least one of the elliptically shaped patterns onto the light sensor array. Each sensor element develops a variable charge, depending on the relative light intensity. The analog information from the camera 12 is fed to interface circuitry, generally designated 16, which digitizes the camera output to sixteen distinct levels of light intensity, and packs it into a form suitable for input through a standard DMA port of a computer, generally designated 18. The light intensity data is stored in the computer memory as 128×128 element array of integers whose value corresponds to the light intensity of respective picture elements.

The interface circuitry 14 also provides the necessary power and control signals to the camera and generates the necessary sweep and level signals to drive a monitor, generally designated 20. The monitor 20 is a cathode ray tube which enables the operator to locate the precise grid circle of interest and adjust the camera for contrast and focus. A suitable interface is the General Electric PN-2100A, which performs all the above functions, except for packing the data and communicating with the DMA port of the computer 18. The data packing and communication functions are well-known to those skilled in the art and may be implemented with logic which stores four digitized light intensity values per computer word and sequentially feeds this information to the computer 18.

The computer 18 is preferably the Digital Equipment Corporation, LSI-11 Microcomputer. A PDP-11VO3 package, available from the computer manufacturer, may be used in practicing the invention and includes the RT-11 operating system, a dual floppy disc drive generally designated 22, and a terminal generally designated at 24. Alternatively, the machine executable program may be stored in a read only memory. As an output medium the system includes a graphic display, generally designated 26. The display 26 is particularly useful where ambiguities arise and it is desirable to have a person verify that a picture has been correctly interpreted. A suitable display controller is the MLSI-512 manufactured by Matrox Electronic Systems. The display 26 contains an array of about 65,000 memory elements with each uniquely associated with a point on a square grid. Thirty times per second, it uses this memory to generate a television signal where the brightness of each point in the image is controlled by one of the memory elements. By writing out the values to a block of memory elements, a picture may be displayed on an attached TV monitor. The MLSI-512 display controller connects directly into the LSI-11 computer bus. In addition, it generates the composite video signal which can be fed directly into a standard TV monitor.

The program for processing the picture data is depicted in a generalized flow chart format in FIG. 4 and a detailed listing in Fortran IV and Macro-11 assembly language is provided hereinafter. Once the picture data is located into the computer memory, the first step in processing the picture is to select a threshold. The picture is assumed to contain one or more dark elliptical patterns against a lighter background. However, as the surface characteristics and the lighting vary, so does the apperance of the pattern in the picture. The process of thresholding is to establish some brightness level below which everything can be considered black (i.e., the pattern area of the picture). Because of the aforementioned variations, it is not possible to select a fixed threshold value which will work for all picture. Preferably the threshold level selected is a gradient-weighted average light intensity. To establish the threshold level a squence of rows, for example rows 32, 64 and 96, in the picture are scanned as shown in FIG. 2. The spacing between the rows is selected to ensure that at least a few true edges are crossed if an elliptical pattern is indeed contained in the image. The computer calculates the gradient at each picture element in the selected rows. For example, with reference to FIG. 3, the gradient around the picture element e would be computed as the absolute value of the sum of the differences between the light intensity values at the picture elements a, i, c and g. More specifically, the gradient $g = |a-i| + |c-g|$. If the gradient exceeds a minimum predetermined value, then the gradient calculated for the element e is added to the sum (SUMG) of the gradient values previously calculated and the sum of the light intensity values at a, i, c and g are multipled by the gradient and added to the sum (SUMGI) of weighted values previously calculated. When all elements in the selected rows have been evaluated, the threshold is equal to SUMGI/(4×SUMG) rounded to the nearest integer.

Once a threshold level has been selected, the image is segmented into solid black and solid white regions. Typically, there will be less than ten of these regions in a picture. This represents a major reduction in the volume of data from approximately 16,000 numbers to a brief description of only a few regions. In order to correctly label all pairs of connected elements as being part of the same region, it is necessary that the segmentation algorithm be capable of handling complex maze-like patterns which do in fact arise in actual pictures. Because of the large number of potential connections and the many picture elements to be considered it is important to perform these computations efficiently. A particularly efficient segmentation approach is one which employs a run length coding algorithm which sequentially examines each element in a row and records the column members where "color" transitions occur. Each row is thus grouped in segments of length defined by column members. A 6-connected algorithm is employed to determine whether segments in succeeding rows overlap previously defined segments or whether a non-overlapping segment has been encountered. Overlap occurs if a picture element is adjacent an element of the same "color". The criteria for adjacency includes each of the four sides of the element as well as the "northeast-southwest" diagonal but not the "northwest-southeast" diagonal. For example, in FIG. 3 the picture element e is connected to the elements b, c, f, h, g and d but not a and i.

When the segmentation process is completed there may, for example, be six regions as shown in FIG. 2. Five of the regions are black and numbered 1-5 while the sixth region is the white background region. The coordinates of a point on the boundary of each region is obtained during segmentation. Regions 1-4 are eliminated from further processing since these regions touch the border of the image and are therefore incomplete patterns. The pattern boundary of region 5 is extracted starting with the point on the boundary identified during the segmentation process. The coordinates (row, column) of this point are stored at the beginning of a list. The program steps through the digitized picture array one cell at a time in a counterclockwise direction around the border until the initial point is reached with coordinates of new points periodically added to the list.

The boundary data points thus identified are fitted to an ellipse using an algorithm for fitting at least-squares conic. The algorithm utilizes the coordinate pairs $(x_k, y_k)$, where k corresponds to the boundary data points 1, 2 ..., n and constructs a 5×5 matrix A and a 5-vector B as follows:

| A | | | | | B | |
|---|---|---|---|---|---|---|
| $\Sigma x_k^4$ | $\Sigma x_k^3 y_k$ | $\Sigma x_k^2 y_k^2$ | $\Sigma x_k^3$ | $\Sigma x_k^2 y_k$ | $\Sigma x_k^2$ |
| ~ | $\Sigma x_k^2 y_k^2$ | $\Sigma x_k y_k^3$ | $\Sigma x_k^2 y_k$ | $\Sigma x_k y_k^2$ | $\Sigma x_k y_k$ |
| ~ | ~ | $\Sigma y_k^4$ | $\Sigma x_k y_k^2$ | $\Sigma x_k y_k^3$ | $\Sigma y_k^2$ |
| ~ | ~ | ~ | $\Sigma x_k^2$ | $\Sigma x_k y_k$ | $\Sigma x_k$ |
| ~ | ~ | ~ | ~ | $\Sigma y_k^2$ | $\Sigma y_k$ |

The sums of matrix A and vector B are over all the data points. It will be noted that matrix A is symmetric, i.e., $A(i,j)=A(j,i)$ and that $A(2,2)=A(1,3)$; $B(1)=A(4,4)$; $A(2,4)=A(1,5)$; $B(2)=A(4,5)$; $A(3,4)=A(2,5)$; $B(3)=A(5,5)$. After the matrix A and the vector B are constructed the linear system $AP=B$ is solved for the 5-vector P. The implicit equation of the fitted conic is:

$$P(1) \cdot x^2 + P(2) \cdot xy + P(3) \cdot y^2 + P(4) \cdot x + P(5) \cdot y = 1$$

If P(2), P(4) and P(5) are replaced by P(2)/2, P(4)/2 and P(5)/2 respectively the center of the fitted conic, having coordinates $x_0$ and $y_0$ is:

$$x_0 = (P(2) \cdot P(5) - P(3) \cdot P(4))/\Delta$$

$$y_0 = (P(2) \cdot P(4) - P(1) \cdot P(5))/\Delta$$

where $$\Delta = P(1) \cdot P(3) - P(2) \cdot P(2)$$

Assuming that the conic is an ellipse the axes are:

$$\alpha = \sqrt{-\frac{F}{S-R}}$$

$$\beta = \sqrt{-\frac{F}{S+R}}$$

where
 $F = 1 - P(4) \cdot x_0 - P(5) \cdot y_0$,
 $S = (P(1) + P(3))/2$,
 $R = \sqrt{D^2 + P(2)^2}$,
 $D = (P(1) - P(3))/2$.

The conic is an ellipse if $|S|$ is greater than $|R|$. The major axis will be $\alpha$ if F and S have the same sign. The angle of inclination of the ellipse is that of the $\alpha$ axis to the X or horizontal axis. The inclination angle $\theta$ can be determined from the formulae:

$$\sin(\theta) = \pm \sqrt{\frac{1 \pm D/R}{2}},$$

$$\cos(\theta) = \sqrt{\frac{1 \mp D/R}{2}}$$

$\theta$ can be construed as an angle in the range $-90°$ to $+90°$ if the radical for sin $(\theta)$ is taken in sign opposition to P(2).

To generate the fitted conic the following parametric equations are employed:

$$x = x_0 + \epsilon\cos(\theta) - \eta\sin(\theta),$$

$$y = y_0 + \epsilon\sin(\theta) + \eta\cos(\theta),$$

where $\epsilon = \alpha\cos(\tau)$ and $\eta = \beta\sin(\tau)$, ($\tau$ ranging from 0 to $2\pi$).

Following a fit to an ellipse, the quality of the fit is checked by measuring the root-mean-square distance from the data points on the pattern boundary to the nearest point on the fitted ellipse. If the error level exceeds an established amount, an attempt to improve the fit is made by eliminating all points further than some tolerance distance from the ellipse. The remaining data points are then used to fit a new ellipse. This refitting operation is repeated a predetermined number of times or until the error level is reduced to an acceptable amount. On each successive fit the allowable error level used for discarding data points is reduced.

Once an acceptable fit is attained, the major and minor strain is computed from the fitted ellipse diameters and also from a chord measurement operation which measures the dimensions of the actual elliptical pattern rather than the dimensions of the fitted ellipse. In both cases strain is calculated by comparing the major and minor diameters of the elliptical pattern with the diameters of the original undistorted circular pattern as determined during calibration. That is to say:

$$\text{STRAIN} = (d - d_0)/d_0$$

where
 d = diameter of elliptical pattern
 $d_0$ = diameter of circular pattern

The chord measurement values are computed by extending the major and minor axes of the pattern as determined by the ellipse fit from the center point of the pattern until they intersect the image borders. The program then steps back through the picture data from the four points on the image border along the axes until the target pattern is reached. The major and minor diameters are then computed as the distance between the two pairs of points found on pattern boundaries along the axes.

Calibration of the system is accomplished by processing undistorted circles in the same manner as described for the elliptical patterns. The circular pattern is fitted to an ellipse so two radius values are computed (which presumably are very close to each other). The average of the two radius values is also computed and the average as well as the radius values are printed for verification by the operator as valid. The average radius for the new circle is then averaged in at equal weight with all previous averages obtained since the system was last initialized.

A complete listing in Fortran IV and Macro-11 assembly language with appropriate comments follows:

```
C       STRAIN.FOR
C
C       STRAIN MEASUREMENT SYSTEM
C
C       *** TOP LEVEL CODE ***
C
C++++ DATA DEFINITION
        LOGICAL*1 PIC(128,128)
        LOGICAL*1 CHAR
C
        INTEGER*2 I,J,K,L,M,N
        INTEGER*2 THRESH,BKGRND
        INTEGER*2 MINSIZ,ITMAX
        INTEGER*2 IREF,BRIEF,REPLY
        INTEGER*2 ROWEXT(2),COLEXT(2)
        INTEGER*2 RLEVEL(64),RNAME(64),RSIZE(64),REGROW(64),REGCOL(64)
        INTEGER*2 RCOUNT,REFCNT,ICOUNT
        INTEGER*2 XP(100),YP(100)
        INTEGER*2 GRAD,TL,TR,BL,BR,QUAL,IAUTO
        INTEGER*2 SETANG
        INTEGER*2 GRAPH
C
        REAL*4 REFPIX,REFNEW
        REAL*4 XBAR,YBAR,PMAJST,PMINST
        REAL*4 PMAJCH,PMINCH,THETA
        REAL*4 RVALST,RVALCH
        REAL*4 ORG(2),AX(2),CS(2),P(5)
        REAL*4 RMSERR,MAXERR,RMSMAX
        REAL*4 TEMP
        REAL*4 SUMG,SUMGI,COUNT
C
        DATA REFCNT,MINSIZ,ITMAX,MINGRD,IAUTO/0,1000,3,4,31/
        DATA THRESH,BKGRND,BRIEF/12,15,1/
        DATA ROWEXT,COLEXT/3,126,3,126/
        DATA REFPIX,MAXERR,RMSMAX/34.,2.,1.5/
        DATA SETANG/0/
        DATA GRAPH/0/
C
C++++ INITIALIZATION DECISIONS
        TYPE 100
100     FORMAT(' STRAIN MEASUREMENT SYSTEM')
        TYPE 1300
1300    FORMAT('$BRIEF MODE? ')
        ACCEPT 300,CHAR
        IF (CHAR .EQ. 'N')BRIEF=0
        TYPE 1310
1310    FORMAT('$GRAPHICS? ')
        ACCEPT 300,CHAR
        IF (CHAR .EQ. 'Y') GRAPH=1
        TYPE 200
200     FORMAT('$DO YOU WISH TO ALTER DEFAULTS? ')
        ACCEPT 300,CHAR
300     FORMAT(A1)
        IF (CHAR .NE. 'Y') GO TO 10
        TYPE 600,ITMAX
600     FORMAT('$MAX FITS=',I6,' / ')
        ACCEPT 500,L,I
        IF (L .NE. 0) ITMAX=I
        TYPE 700,THRESH,BKGRND
700     FORMAT('$THRESH, BKGRND=',2I6,' / ')
        ACCEPT 500,L,I,J
        IF (L .EQ. 0) GO TO 20
            THRESH=I
            BKGRND=J
20      CONTINUE
        TYPE 800,MINGRD,IAUTO
800     FORMAT('$AUTO GRAD MIN, INC=',2I6,' / ')
        ACCEPT 500,L,I,J
        IF (L .EQ. 0) GO TO 9
            MINGRD=I
            IAUTO=J
```

```
9       CONTINUE
        TYPE 900,ROWEXT,COLEXT
900     FORMAT('$ROW, COL WINDOW=',4I6,' / ')
        ACCEPT 500,L,I,J,K,M
        IF (L .EQ. 0) GO TO 30
                ROWEXT(1)=I
                ROWEXT(2)=J
                COLEXT(1)=K
                COLEXT(2)=M
30      CONTINUE
        TYPE 9000,REFPIX
9000    FORMAT('$REFPIX=',F6.1,' / ')
        ACCEPT 1100,L,TEMP
        IF (L .NE. 0) REFPIX=TEMP
        TYPE 1000,MAXERR
1000    FORMAT('$ERROR STEP=',F6.1,' / ')
        ACCEPT 1100,L,TEMP
1100    FORMAT(Q,F8.2)
        IF (L .NE. 0)MAXERR=TEMP
        TYPE 1200,RMSMAX
1200    FORMAT('$ERROR CUTOFF=',F6.1,' / ')
        ACCEPT 1100,L,TEMP
        IF (L .NE. 0)RMSMAX=TEMP
        TYPE 1201
1201    FORMAT('$SET ANGLE = NULL / ')
        ACCEPT 1100,L,TEMP
        IF (L .EQ. 0) GO TO 1202
                SETANG=1
                TEMP=TEMP*0.017453
                CS(1)=COS(TEMP)
                CS(2)=SIN(TEMP)
1202    CONTINUE
10      CONTINUE
C
C++++ TOP OF MAIN LOOP
1111    TYPE 1400
1400    FORMAT(/,' READY',/)
        CALL STNDBY(REPLY)
        IREF=0
        IF (REPLY .NE. 0)IREF=1
C
C
C++++ CLEAR SCREEEN JUST BEFORE DIGITIZING NEW PICTURE
        IF (GRAPH .EQ. 1)CALL MSET(REPLY,0,0,0)
        CALL GETPIC(REPLY,PIC)
        IF (REPLY .EQ. 1) GO TO 40
                TYPE 1500,REPLY
1500            FORMAT(' GETPIC: DIGITIZE ERROR=',I6)
                GO TO 1111
40      CONTINUE
C
C++++ SELECT A NEW THRESHOLD LEVEL
        IF (MINGRD .EQ. 0) GO TO 135
C
        SUMG=0.
        SUMGI=0.
        COUNT=0.
C
        DO 120 I=ROWEXT(1)+IAUTO,ROWEXT(2)-2,IAUTO
          DO 110 J=COLEXT(1),COLEXT(2)-2
C
                TL=PIC(J,I)
                TR=PIC(J+2,I)
                BL=PIC(J,I+2)
                BR=PIC(J+2,I+2)
C
                GRAD=IABS(TL-BR) + IABS(TR-BL)
C
                IF (GRAD .LT. MINGRD) GO TO 90
                        SUMG=SUMG+GRAD
                        COUNT=COUNT+1.0
                        SUMGI=SUMGI+GRAD*(TL+TR+BL+BR)
90              CONTINUE
C
110       CONTINUE
120     CONTINUE
C
        IF (COUNT .GT. 4.) GO TO 130
                TYPE 1900
1900            FORMAT(' AUTOTH: INSUFFICIENT CONTRAST TO THRESHOLD')
                GO TO 1111
130     CONTINUE
```

```
C
        QUAL=3.3333*SUMG/COUNT
        THRESH=SUMGI/(4.*SUMG)+0.5
C
        IF (BRIEF .EQ. 0) TYPE 2000,THRESH,QUAL,COUNT
2000    FORMAT(' THRESH,QUAL,COUNT=',2I6,F8.0)
C
135     CONTINUE
C
C++++ SEGMENT PICTURE AND COUNT INTERIOR REGIONS
        CALL SEGMNT(REPLY,PIC,PIC,ROWEXT,COLEXT,THRESH,BKGRND,
     1  MINSIZ,RLEVEL,RNAME,RSIZE,REGROW,REGCOL,RCOUNT)
        IF (REPLY .EQ. 1) GO TO 50
                TYPE 1600,REPLY
1600            FORMAT(' SEGMNT: ERROR=',I6)
                GO TO 1111
50      CONTINUE
C
        IF (RCOUNT .GE. 1) GO TO 60
                TYPE 1700
1700            FORMAT(' SEGMNT: NO PATTERNS FOUND IN IMAGE')
                GO TO 1111
60      CONTINUE
C
        ICOUNT=0
        DO 70 I=1,RCOUNT
                IF (RSIZE(I) .LT. 0) GO TO 70
                        ICOUNT=ICOUNT+1
                        REGROW(ICOUNT)=REGROW(I)
                        REGCOL(ICOUNT)=REGCOL(I)
                        RNAME(ICOUNT)=RNAME(I)
C                       RSIZE(ICOUNT)=RSIZE(I)
70      CONTINUE
C
        IF (ICOUNT .NE. 0) GO TO 80
                TYPE 1800
1800            FORMAT(' SEGMNT: ALL PATTERNS TOUCH BORDER')
                GO TO 1111
80      CONTINUE
C
C++++ PROCESS ALL INTERNAL PATTERNS UNTIL ONE IS FOUND WHICH IS OK
        DO 2222 K=1,ICOUNT
C
C++++ DISPLAY PATTERN IMAGE
        IF (GRAPH .EQ. 1) CALL MSLICE(REPLY,0,0,PIC,128,128,
     1  RNAME(K),1)
C
C++++ FIRST FIND BOUNDARY POINT ARRAY
        CALL PERIPH(PIC,REGROW(K),REGCOL(K),XP,YP,4,100,N)
        IF (N .NE. 0) GO TO 140
                TYPE 3000
3000            FORMAT(' PERIPH: NO POINTS')
                GO TO 1111
140     CONTINUE
C
C++++ FIT TO AN ELLIPSE
        ITER=1
C
C++++ ABORT FIT IF TOO FEW DATA POINTS
145     IF (N .GE. 15) GO TO 150
                TYPE 2100,ITER,N
2100            FORMAT(' ITERATION',I3,' CANCELLED / POINTS=',I3)
                IF (ITER .EQ. 1) GO TO 1111
                GO TO 190
150     CONTINUE
C
C++++ OK, LET'S TRY A FIT
        CALL LSQCH(REPLY,XP,YP,N,ORG,AX,CS,P,PATCH,SETANG)
C
C       RESET ORG(2) TO GET AROUND COMPILER ERROR
        ORG(2)=PATCH
        IF (REPLY .EQ. 1) GO TO 160
                TYPE 2200,REPLY
2200            FORMAT(' LSQCH: UNABLE TO FIT ELLIPSE',I6)
                GO TO 2222
160     CONTINUE
C
C++++ LET'S SEE HOW GOOD A FIT WE GOT
        CALL ERRANL(ORG,AX,CS,P,XP,YP,N,BRIEF,
     1  ((ITMAX-ITER)*MAXERR),RMSERR)
C
```

```
C++++ IF WE HAVE A BAD FIT, TRY AGAIN
        ITER=ITER+1
        IF (RMSERR .LE. RMSMAX) GO TO 190
            IF (BRIEF .EQ. 0)TYPE 2300,RMSERR
2300        FORMAT(' FIT NOT GOOD ENOUGH',F8.2)
C
        IF (ITER .LE. ITMAX) GO TO 145
190     CONTINUE
C
C++++ DISPLAY FITTED ELLIPSE
        IF (GRAPH .EQ. 0) GO TO 162
            J=1
            DO 161 I=0,360,8
                TEMP=I*0.017453
                CALL ECON(ORG,AX,CS,TEMP,YBAR,XBAR)
                XP(J)=XBAR-0.5
                YP(J)=YBAR+127.5
                J=J+1
161         CONTINUE
            CALL MVECT2(REPLY,XP,YP,J-1,1)
            RSIZE(1)=128
            RSIZE(2)=128
            RSIZE(3)=0
            CALL MSCROL(REPLY,RSIZE,3,100,1)
        CALL MVECT2(REPLY,XP,YP,J-1,0)
        DO 163 I=1,J-1
            XP(I)=XP(I)+128
            YP(I)=YP(I)-128
163     CONTINUE
        CALL MVECT2(REPLY,XP,YP,J-1,1)
162     CONTINUE
C
C++++ SETUP RESULTS FROM FIT DATA
C
C       NOTE THAT THE FOLLOWING STMTS SET THETA=ASIN(CS(2))
        TEMP=ABS(CS(2))
        THETA=0.
        IF (TEMP .NE. 1)
       1 THETA=ATAN(TEMP/SQRT(1-TEMP**2))
        IF (CS(2) .LT. 0.) THETA=-THETA
C
        XBAR=ORG(1)
        YBAR=ORG(2)
        PMAJST=AX(1)/REFPIX*100.-100.
        PMINST=AX(2)/REFPIX*100.-100.
        RVALST=999.
        IF (AX(2) .NE. 0.)
       1RVALST=ALOG(REFPIX/AX(2)) / ALOG(AX(1)*AX(2)/REFPIX**2)
C
C++++ SETUP RESULTS FROM CHORD METHOD
        CALL CHORD(ORG,CS,RNAME(K),PIC,ROWEXT,COLEXT,PMAJCH,PMINCH)
        RVALCH=999.
        IF (PMINCH .NE. 0.)
       1RVALCH=ALOG(REFPIX/PMINCH) / ALOG(PMINCH*PMAJCH/REFPIX**2)
        PMINCH=PMINCH/REFPIX*100.-100.
        PMAJCH=PMAJCH/REFPIX*100.-100.
C
C++++ OPTIONAL PRINT OF LONG FORM RESULTS
        IF (BRIEF .NE. 0) GO TO 210
C
        TYPE 2500,K,ICOUNT
2500    FORMAT(/,' CANDIDATE',I2,' OF ',I2)
        TYPE 2600,XBAR,YBAR
2600    FORMAT(' CENTER AT',2F7.3)
        TYPE 2700,THETA
2700    FORMAT(' MAJOR AXIS RADIANS=',F7.4)
        TYPE 2800,RVALST,RVALCH
2800    FORMAT(' RVALUE & APPROX=',2F8.4)
C
C++++ BRIEF FORMAT RESULTS
210     TYPE 3100,PMAJST,PMAJCH
3100    FORMAT(/,' PERCENT MAJOR STRAIN=',F7.1,' (',F7.1,')')
        TYPE 3200,PMINST,PMINCH
3200    FORMAT(' PERCENT MINOR STRAIN=',F7.1,' (',F7.1,')')
C
C++++ ARE THERE OTHER CANDIDATE PATTERNS?
        IF (K .EQ. ICOUNT) GO TO 220
            TYPE 3300
3300        FORMAT('$SHOULD WE TRY THE NEXT CANDIDATE? ')
            ACCEPT 300,CHAR
            IF (CHAR .NE. 'Y') GO TO 220
C
2222    CONTINUE
```

```fortran
C
220     IF (IREF .NE. 1) GO TO 1111
C
C++++ POST PROCESSING FOR REFERENCE PATTERNS ONLY
        REFNEW=(AX(1)+AX(2))*0.5
        TYPE 3400,AX(1),AX(2),REFNEW
3400    FORMAT('$IS THIS A VALID REFERENCE (',3F8.2,') ? ')
        ACCEPT 300,CHAR
        IF (CHAR .NE. 'Y') GO TO 1111
C
C++++ ACCEPT REFERENCE
        REFPIX=(REFCNT*REFPIX+REFNEW)/(REFCNT+1)
        REFCNT=REFCNT+1
        TYPE 3500,REFPIX,REFCNT
3500    FORMAT(' PATTERN ACCEPTED, REF=',F7.3,I6)
        GO TO 1111
C
        END
C       SEGMNT.FOR
C
C       SUBROUTINE TO DO A FAST BINARY SEGMENTATION
C       OF A 128 X 128 DIGITAL IMAGE
C
C       THIS SUBPROGRAM DOES NOT RETAIN INTERIOR REGIONS.
C       IT RETURNS THE COORDINATES OF A POINT ON THE BOUNDRY
C       OF EVERY REGION FOUND.  REGION AREAS WHICH
C       TOUCH THE PICTURE WINDOW ARE RETURNED AS THE
C       NEGATIVE OF THE TRUE AREA.
C
C       ERROR CODES:
C               1:      SUCCESS
C               2:      BAD INPUT PARAMETERS
C               3:      RUNMAX PARAMETER TOO LOW
C               4:      CMAX PARAMETER TOO LOW
C               5:      SMAX PARAMETER TOO LOW
C
        SUBROUTINE SEGMNT(IERR,INPIC,OUTPIC,ROWEXT,COLEXT,ITHR,
       1 IBACK,IMIN,RLEVEL,RNAME,RSIZE,REGROW,REGCOL,RCOUNT)
C
C
C****************************************************************
C
C++++ PARAMETERS
C
        INTEGER*2 N,SMAX,CMAX,QMAX,RUNMAX,NULL,BLACK,WHITE
        REAL*4 PI,PI OVR 2,PI OVR 4,PI 3 OV 4
        COMMON /SHARE/N,SMAX,CMAX,QMAX,RUNMAX,NULL,BLACK,WHITE
        COMMON /SHARE/PI,PI OVR 2,PI OVR 4,PI 3 OV 4
C
C++++ ACTIVE LINE & SEGMENT DESCRIPTORS
C
        INTEGER ACTLIN
        INTEGER SCOLNO(50)
        INTEGER SCOMP(50)
        INTEGER SPREV(50)
        INTEGER SNEXT(50)
        COMMON /SHARE/ACTLIN,SCOLNO,SCOMP,SPREV,SNEXT
C
C++++ COMPONENT DESCRIPTORS
C
        INTEGER CX0(64)
        INTEGER CY0(64)
        INTEGER SUM1(64)
        INTEGER CNEXT(64)
        INTEGER CSON(64)
        INTEGER MASTER(64)
        COMMON /SHARE/CX0,CY0,SUM1,CNEXT,CSON,MASTER
C       COMMON /SHARE/SUMX,SUMY
C
C++++ RUN LENGTH CODE DATA
C
        INTEGER RUNCDE(50)
        INTEGER QL(16)
        INTEGER QR(16)
        INTEGER QNEXT(16)
        INTEGER QPREV,QPTR,QFREE,QHEAD
        COMMON /SHARE/QL,QR,QNEXT
        COMMON /SHARE/QPREV,QPTR,QFREE,QHEAD
C
C++++ MISC GLOBAL VARIABLES
C
        INTEGER CURSEG,CBACK
```

```
      INTEGER SFREE,CFREE
      INTEGER THRESH,BKGRND,MINSIZ,XPOS
      INTEGER ROWEX(2),COLEX(2)
      INTEGER RELOLD,RELNEW
      COMMON /SHARE/CURSEG,CBACK,SFREE,CFREE,THRESH,BKGRND
      COMMON /SHARE/MINSIZ,XPOS
      COMMON /SHARE/ROWEX,COLEX
      COMMON /SHARE/RELOLD,RELNEW
C
C*******************************************************************
C
      INTEGER ROWEXT(2),COLEXT(2),ITHR,IBACK,IMIN
      INTEGER RLEVEL(64),RNAME(64),RSIZE(64),RCOUNT
      INTEGER REGROW(64),REGCOL(64)
      INTEGER FIRST,SECOND
      INTEGER STACK(64),SPTR,INDEX,P
      LOGICAL*1 INPIC(128,128),OUTPIC(128,128)
C
      N=128
      SMAX=50
      CMAX=64
      QMAX=16
      RUNMAX=50
      NULL=-1
      BLACK=0
      WHITE=1
      PI=3.141 592 6
      PI OVR 2=1.570 796 3
      PI OVR 4=0.785 398 16
C
C     SET UP REPLY CODE TO SUCCESS VALUE
      IERR=1
C
C     VERIFY INPUT ARGS ARE ACCEPTABLE AND CONSISTANT
C
D     IF (ROWEXT(1) .LT. 1)GO TO 999
D     IF ((ROWEXT(2) .LT. ROWEXT(1)) .OR. (ROWEXT(2) .GT. N))GO TO 999
D     IF (COLEXT(1) .LT. 1)GO TO 999
D     IF ((COLEXT(2) .LT. COLEXT(1)) .OR. (COLEXT(2) .GT. N))GO TO 999
D     IF (IMIN .GE. 1) GO TO 1
D999  CONTINUE
D     TYPE 100,ROWEXT,COLEXT,IMIN,N
D100  FORMAT(' BAD PARAMETERS TO SEGMNT: ROWEXT=',2I6,
D    1 ' COLEXT=',2I6,' MINSIZ=',I6,' N=',I6)
D     IERR=2
D     GO TO 9999
C
C     ALL INPUT ARGS ARE ACCEPTABLE SO PROCEED
C
1     CONTINUE
C
C     INITIALIZE DATA STRUCTURES
C     NOTE: MOST OF THIS COULD BE PUT INTO DATA STMTS
C
      RELNEW=NULL
      THRESH=ITHR
      BKGRND=IBACK
      MINSIZ=IMIN
C
C     COPY WINDOW INTO GLOBAL COMMON
C
      ROWEX(1)=ROWEXT(1)
      ROWEX(2)=ROWEXT(2)
      COLEX(1)=COLEXT(1)
      COLEX(2)=COLEXT(2)
C
C     SET UP SEGMENT FREE LIST
C
      SFREE=3
      DO 1010 I=3,SMAX-1
         SNEXT(I)=I+1
1010  CONTINUE
      SNEXT(SMAX)=NULL
C
C     SET UP COMPONENT FREE LIST
C
      CFREE=2
      DO 1020 I=2,CMAX-1
         CNEXT(I)=I+1
1020  CONTINUE
      CNEXT(CMAX)=NULL
C
```

```
C         INITIALIZE ACTIVE LINE
C
          CBACK=1
          CNEXT(1)=NULL
          CSON(1)=NULL
          MASTER(1)=NULL
          ACTLIN=1
          SCOLNO(1)=-1
          SCOMP(1)=CBACK
          SPREV(1)=NULL
          SNEXT(1)=2
          SCOLNO(2)=1000
          SCOMP(2)=CBACK
          SPREV(2)=ACTLIN
          SNEXT(2)=NULL
C
          DO 2 I=ROWEXT(1),ROWEXT(2)
                XPOS=I
C
C         RUN CODE INPUT ROW
C
                INDEX=1
                J=COLEXT(1)
                IF (THRESH .LE. BKGRND) GO TO 2020
C
C         FOLLOW BLACK
C
2010            IF (J .GT. COLEXT(2)) GO TO 2040
                IF (INPIC(J,I) .LT. THRESH) GO TO 2015
C
                IF ((J+1) .GT. COLEXT(2)) GO TO 2014
                IF (INPIC(J+1,I) .LT. THRESH) GO TO 2015
2014            CONTINUE
C
                RUNCDE(INDEX)=J
                INDEX=INDEX+1
                IF (INDEX .GT. (RUNMAX-2)) GO TO 2060
                J=J+1
                GO TO 2020
2015            J=J+1
                GO TO 2010
C
C         BLACK SEGMENT WRAP UP
C
2040            IF (BKGRND .LT. THRESH) GO TO 2050
                RUNCDE(INDEX)=J
                INDEX=INDEX+1
                GO TO 2050
C
C         FOLLOW WHITE
C
2020            IF (J .GT. COLEXT(2))GO TO 2021
                IF (INPIC(J,I) .GE. THRESH)GO TO 2025
C
                IF ((J+1) .GT. COLEXT(2)) GO TO 2024
                IF (INPIC(J+1,I) .GE. THRESH) GO TO 2025
2024            CONTINUE
C
                RUNCDE(INDEX)=J
                INDEX=INDEX+1
                IF (INDEX .GT. RUNMAX-2) GO TO 2060
                J=J+1
                GO TO 2010
2025            J=J+1
                GO TO 2020
C
C         WHITE SEGMENT WRAP UP
C
2021            IF (BKGRND .GE. THRESH) GO TO 2050
                RUNCDE(INDEX)=J
                INDEX=INDEX+1
                GO TO 2050
C
C         ERROR EXIT, OVERFLOW OF RUNCDE ARRAY
C
2060            CONTINUE
C               RUNCDE(1)=0
C               RCOUNT=0
                IERR=3
                GO TO 9999
C
C         RUNCDE FILL WRAP UP
C
```

```
2050              RUNCDE(INDEX)=0
C
C++++   PROCES ROW
C
C
C       SET UP
C
                  CURSEG=ACTLIN
                  FIRST=-1
                  INDEX=1
                  RELNEW=NULL
C
C                 SEGMENT PROCESSING LOOP
C
3010              SECOND=RUNCDE(INDEX)
                  IF (SECOND .EQ. 0) GO TO 3020
                  CALL SEGPRO(FIRST,SECOND,OUTPIC,IERR)
                  IF (IERR .NE. 1) GO TO 9999
                  FIRST=SECOND
                  INDEX=INDEX+1
                  GO TO 3010
C
C       SEGMENT PROCESS LOOP EXIT
C
3020              CALL SEGPRO(FIRST,1000,OUTPIC,IERR)
                  IF (IERR .NE. 1) GO TO 9999
C
C       CLEAN UP NON-CONTINUED SEGMENTS AT RIGHT OF ROW
C
3065              IF (SNEXT(CURSEG) .EQ. NULL)GO TO 3070
                  CALL DELETE(OUTPIC)
                  GO TO 3065
3070              CONTINUE
C
C++++ WRITE BACK OUT REGION NUMBERS INTO OUTPIC
C
                  CURSEG=ACTLIN
                  FIRST=COLEXT(1)
4010              SECOND=SCOLNO(SNEXT(CURSEG))
                  IF (SECOND .EQ. 1000)GO TO 4020
C
                  IF (FIRST .GE. SECOND) GO TO 4012
                       K=SCOMP(CURSEG)
                       DO 4011 J=FIRST,SECOND-1
                            OUTPIC(J,I)=K
4011                   CONTINUE
4012              CONTINUE
                  CURSEG=SNEXT(CURSEG)
                  FIRST=SECOND
                  GO TO 4010
4020              IF (FIRST .GT. COLEXT(2)) GO TO 4022
                       K=SCOMP(CURSEG)
                       DO 4021 J=FIRST,COLEXT(2)
                            OUTPIC(J,I)=K
4021                   CONTINUE
4022              CONTINUE
C
2       CONTINUE
C
C++++ PROCESS A NULL ROW TO TERMINATE ANY OBJECTS STILL LEFT
C
        XPOS=ROWEXT(2)+1
        CURSEG=ACTLIN
        CALL SEGPRO(-1,1000,OUTPIC,IERR)
        IF (IERR .NE. 1) GO TO 9999
C
5065    IF (SNEXT(CURSEG) .EQ. NULL) GO TO 5070
             CALL DELETE(OUTPIC)
             GO TO 5065
5070    CONTINUE
C
C++++ DETECT REGIONS ON THE BOUNDARY AND MARK IN MASTER FIELD
C
        DO 398 I=1,CMAX
             MASTER(I)=1
398     CONTINUE
C
        DO 397 I=ROWEX(1),ROWEX(2)
             J=OUTPIC(COLEX(1),I)
             MASTER(J)=-1
             J=OUTPIC(COLEX(2),I)
             MASTER(J)=-1
397     CONTINUE
```

```fortran
C
          DO 396 J=COLEX(1),COLEX(2)
             I=OUTPIC(J,ROWEX(1))
             MASTER(I)=-1
             I=OUTPIC(J,ROWEX(2))
             MASTER(I)=-1
396       CONTINUE
C
C         TAKE APART COMPONENT GRAPH TO PRODUCE RETURN STRUCTURE
C         DESCRIBING IMAGE (DEPTH FIRST SEARCH)
C
C         INITIALIZE BY PUSHING THE FIRST TOP LEVEL OBJECT ONTO THE
C         STACK AND SETTING UP COUNT INDEX=1
C
          INDEX=1
          STACK(1)=CSON(CBACK)
          SPTR=1
C
C         TOP OF LOOP -- POP REGION FROM STACK
C         IF STACK EMPTY WE'RE DONE, IF REGION NULL GO TO TOP OF LOOP
C
3         CONTINUE
          IF (SPTR .EQ. 0) GO TO 4
          P=STACK(SPTR)
          SPTR=SPTR-1
          IF (P .EQ. NULL)GO TO 3
C
C         PUSH BROTHER IF ANY OR NULL IF NOT TO HOLD PLACE IN STACK
C
          SPTR=SPTR+1
          STACK(SPTR)=CNEXT(P)
C
C         OUTPUT REGION INFO AT LEVEL 'SPTR' INTO OUTPUT SLOT 'INDEX'
C
          RLEVEL(INDEX)=SPTR
          RNAME(INDEX)=P
C
C         NOTE ADDITION OF MULTIPLICATION TO MARK BOUNDARY REGIONS
C         MASTER(P) IS -1 FOR BOUNDARY REGIONS, ELSE +1
C
          RSIZE(INDEX)=SUM1(P)*MASTER(P)
          REGROW(INDEX)=CX0(P)
          REGCOL(INDEX)=CY0(P)
          INDEX=INDEX+1
C
C         PUSH SON OF P IF ANY
C
          IF (CSON(P) .EQ. NULL) GO TO 3
          SPTR=SPTR+1
          STACK(SPTR)=CSON(P)
          GO TO 3
C
C         GRAPH VISITING WRAP UP
C
4         CONTINUE
          RCOUNT=INDEX-1
9999      RETURN
          END
C         SEGPRO.FOR
C
C         THIS IS A SUBROUTINE OF SEGMNT USED TO UPDATE THE ACTIVE LINE
C         FOR EACH NEW SEGMENT IN THE CURRENT LINE
C
          SUBROUTINE SEGPRO(FIRST,SECOND,OUTPIC,IERR)
C
C*****************************************************************
C
C++++ PARAMETERS
C
          INTEGER*2 N,SMAX,CMAX,QMAX,RUNMAX,NULL,BLACK,WHITE
          REAL*4 PI,PI OVR 2,PI OVR 4,PI 3 OV 4
          COMMON /SHARE/N,SMAX,CMAX,QMAX,RUNMAX,NULL,BLACK,WHITE
          COMMON /SHARE/PI,PI OVR 2,PI OVR 4,PI 3 OV 4
C
C++++ ACTIVE LINE & SEGMENT DESCRIPTORS
C
          INTEGER ACTLIN
          INTEGER SCOLNO(50)
          INTEGER SCOMP(50)
          INTEGER SPREV(50)
          INTEGER SNEXT(50)
          COMMON /SHARE/ACTLIN,SCOLNO,SCOMP,SPREV,SNEXT
C
```

```
C++++ COMPONENT DESCRIPTORS
C
      INTEGER CX0(64)
      INTEGER CY0(64)
      INTEGER SUM1(64)
      INTEGER CNEXT(64)
      INTEGER CSON(64)
      INTEGER MASTER(64)
      COMMON /SHARE/CX0,CY0,SUM1,CNEXT,CSON,MASTER
C     COMMON /SHARE/SUMX,SUMY
C
C++++ RUN LENGTH CODE DATA
C
      INTEGER RUNCDE(50)
      COMMON /SHARE/RUNCDE
C
C++++ RENUM QUEUE DATA
C
      INTEGER QL(16)
      INTEGER QR(16)
      INTEGER QNEXT(16)
      INTEGER QPREV,QPTR,QFREE,QHEAD
      COMMON /SHARE/QL,QR,QNEXT
      COMMON /SHARE/QPREV,QPTR,QFREE,QHEAD
C
C++++ MISC GLOBAL VARIABLES
C
      INTEGER CURSEG,CBACK
      INTEGER SFREE,CFREE
      INTEGER THRESH,BKGRND,MINSIZ,XPOS
      INTEGER ROWEX(2),COLEX(2)
      INTEGER RELOLD,RELNEW
      COMMON /SHARE/CURSEG,CBACK,SFREE,CFREE,THRESH,BKGRND
      COMMON /SHARE/MINSIZ,XPOS
      COMMON /SHARE/ROWEX,COLEX
      COMMON /SHARE/RELOLD,RELNEW
C
C*******************************************************************
C
      INTEGER*2 FIRST,SECOND
      LOGICAL*1 OUTPIC(128,128)
      INTEGER*2 P
      INTEGER L,X
      INTEGER ZFIRST,ZSECND
C
C++++ CASE 1: NEW SEGMENT TO RIGHT OF CURRENT SEGMENT
1     P=SNEXT(CURSEG)
      IF (P .EQ. NULL) GO TO 2
      IF (FIRST .LT. SCOLNO(P)) GO TO 2
            RELNEW=NULL
            CALL DELETE(OUTPIC)
            GO TO 1
C
C++++ CASE 2: NEW SEGMENT TO LEFT OF CURRENT SEGMENT
2     IF (SECOND .GE. SCOLNO(CURSEG)) GO TO 3
            CALL INSER(FIRST,SECOND,OUTPIC,IERR)
            IF (IERR .NE. 1) GO TO 999
            P=SCOMP(CURSEG)
            CX0(P)=XPOS
            CY0(P)=FIRST
C           (CONTINUE ON WITH CASE 3 PROCESSING)
            GO TO 4
C
C++++ CASE 3: NEW SEGMENT TOUCHES CURRENT SEGMENT
3     RELNEW=NULL
4     P=SCOMP(CURSEG)
      IF (P .EQ. CBACK) GO TO 6
      IF (SECOND .EQ. 1000) GO TO 6
C
C++++ COMPUTE X OFFSET FROM BASE
      X=XPOS
C
C++++ ADJUST RUNNING TOTALS
10    CONTINUE
      ZFIRST=FIRST
      ZSECND=SECOND
      L=ZSECND-ZFIRST
      SUM1(P)=SUM1(P)+L
6     SCOLNO(CURSEG)=FIRST
      CURSEG=SNEXT(CURSEG)
999   RETURN
      END
```

```
C       INSER.FOR
C
C       THE PURPOSE OF THIS SUBROUTINE IS TO INSERT
C       A NEW COMPONENT INTO THE ACTIVE LINE
C       DURING SEGMENTATION
C
        SUBROUTINE INSER(FIRST,SECOND,OUTPIC,IERR)
C
C***********************************************************************
C
C++++ PARAMETERS
C
        INTEGER*2 N,SMAX,CMAX,QMAX,RUNMAX,NULL,BLACK,WHITE
        REAL*4 PI,PI OVR 2,PI OVR 4,PI 3 OV 4
        COMMON /SHARE/N,SMAX,CMAX,QMAX,RUNMAX,NULL,BLACK,WHITE
        COMMON /SHARE/PI,PI OVR 2,PI OVR 4,PI 3 OV 4
C
C++++ ACTIVE LINE & SEGMENT DESCRIPTORS
C
        INTEGER ACTLIN
        INTEGER SCOLNO(50)
        INTEGER SCOMP(50)
        INTEGER SPREV(50)
        INTEGER SNEXT(50)
        COMMON /SHARE/ACTLIN,SCOLNO,SCOMP,SPREV,SNEXT
C
C++++ COMPONENT DESCRIPTORS
C
        INTEGER CX0(64)
        INTEGER CY0(64)
        INTEGER SUM1(64)
        INTEGER CNEXT(64)
        INTEGER CSON(64)
        INTEGER MASTER(64)
        COMMON /SHARE/CX0,CY0,SUM1,CNEXT,CSON,MASTER
        COMMON /SHARE/SUMX,SUMY
C
C
C++++ RUN LENGTH CODE DATA
C
        INTEGER RUNCDE(50)
        COMMON /SHARE/RUNCDE
C
C++++ RENUM QUEUE DATA
C
        INTEGER QL(16)
        INTEGER QR(16)
        INTEGER QNEXT(16)
        INTEGER QPREV,QPTR,QFREE,QHEAD
        COMMON /SHARE/QL,QR,QNEXT
        COMMON /SHARE/QPREV,QPTR,QFREE,QHEAD
C
C++++ MISC GLOBAL VARIABLES
C
        INTEGER CURSEG,CBACK
        INTEGER SFREE,CFREE
        INTEGER THRESH,BKGRND,MINSIZ,XPOS
        INTEGER ROWEX(2),COLEX(2)
        INTEGER RELOLD,RELNEW
        COMMON /SHARE/CURSEG,CBACK,SFREE,CFREE,THRESH,BKGRND
        COMMON /SHARE/MINSIZ,XPOS
        COMMON /SHARE/ROWEX,COLEX
        COMMON /SHARE/RELOLD,RELNEW
C
C***********************************************************************
C
        LOGICAL*1 OUTPIC(128,128)
        INTEGER*2 FIRST,SECOND
        INTEGER*2 SURCMP,A,B,CPREV,NEWCMP
        INTEGER C,P,P2
C
C++++ STORE POINTER TO PREVIOUS SEGMENT
        CPREV=SPREV(CURSEG)
C
C++++ PREVIOUS SEGMENT IS PART OF REGION WHICH WILL SURROUND NEW OBJECT
        SURCMP=SCOMP(CPREV)
C
C++++ ALLOCATE SPACE FOR NEW COMPONENT
C
        IF (CFREE .EQ. NULL) GO TO 13
            C=CFREE
            CFREE=CNEXT(C)
            GO TO 70
```

```
13        CONTINUE
C
          IERR=4
          GO TO 999
70        CONTINUE
C
C++++ INITIALIZE COMPONENT DESCRIPTOR
          SUM1(C)=0
          CNEXT(C)=NULL
          CSON(C)=NULL
          MASTER(C)=NULL
C
          NEWCMP=C
C
C
C++++ ALLOCATE 2 NEW SEGMENT DESCRIPTORS
          IF (SFREE .EQ. NULL) GO TO 50
                A=SFREE
                SFREE=SNEXT(SFREE)
          IF (SFREE .EQ. NULL) GO TO 50
                B=SFREE
                SFREE=SNEXT(SFREE)
          GO TO 55
C
C         SMAX TOO LOW / ERROR PATH
50        IERR=5
          GO TO 999
55        CONTINUE
C
C++++ LINK THE 2 NEW SEGMENT DESCRIPTORS INTO THE ACTIVE LINE
          SNEXT(A)=B
          SPREV(B)=A
          SNEXT(CPREV)=A
          SPREV(A)=CPREV
          SNEXT(B)=CURSEG
          SPREV(CURSEG)=B
C
C++++ FILL IN THE COMPONENT NUMBERS AND COLUMN NUMBERS
          SCOMP(A)=NEWCMP
          SCOLNO(A)=FIRST
          SCOMP(B)=SURCMP
          SCOLNO(B)=SECOND
C
C++++ SPECIAL CASE, RELABEL
          IF (SCOMP(B) .NE. RELNEW) GO TO 6
          IF (XPOS .EQ. ROWEX(1)) GO TO 6
          IF (OUTPIC(FIRST,XPOS-1) .EQ. RELOLD) GO TO 5
          RENEW=NULL
          GO TO 6
5         SCOMP(B)=RELOLD
6         CONTINUE
C
C++++ RESET THE CURRENT SEGMENT POINTER TO BE THE NEW ONE
          CURSEG=A
999       RETURN
          END
C         DELETE.FOR
C
          SUBROUTINE DELETE(OUTPIC)
C
C         THE PURPOSE OF THE DELETE OPERATION IS TO DELETE A SEGMENT
C         FROM THE ACTIVELINE DURING THE SEGMENTATION PROCESS.
C         BOTH THE CURRENT SEGMENT DESCRIPTOR AND THE
C         FOLLOWING DESCRIPTOR WILL BE UNLINKED AND THEIR STORAGE
C         RECLAIMED.
C
C         EXAMPLE:
C
C         ACTIVELINE  -> (-1,B) -> (6,2) -> (8,3) -> (10,2) -> (13,B) -> (1000,X)
C                                            -        -         -
C           (COL#,COMP#)                     |        |         |
C                                           LEFT    CURSEG    RIGHT
C
C         LAST LINE   ->   (.....XX..XXX........... )
C         NEW LINE    ->   (......XXXX............. )
C
C         THIS REQUIRES DELETION OF BOTH (8,3) AND (10,2) TO REFLECT THE
C         TERMINATION OF THE REGION.
C
C         NEW ACTIVELINE -> (-1,B) -> (7,2) -> (11,B) -> (1000,X)
C
C         TERMINATION OF THESE SEGMENTS ALWAYS MEANS THAT (1) THE
C         SEGMENTS TO THE "RIGHT" AND "LEFT" OF THE CURRENT SEGMENT HAVE
```

```
C           BEEN MERGED INTO ONE AND (2) THE REGION ASSOCIATED WITH THE
C           CURSEG (OR A PIECE THEREOF) HAS BEEN TERMINATED.
C
C           TWO IMPORTANT THINGS MUST BE TAKEN CARE OF IN DELETE BEFORE
C           WE ALLOW THE ACTIVELINE TO BE SO SHORTENED.  THE FIRST
C           CONCERNS THE MERGING OF THE TWO SEGMENTS; THE SECOND CONCERNS
C           THE POSSIBLE TERMINATION OF AN OBJECT.
C
C           MERGING OF "LEFT" AND "RIGHT" SEGMENTS:
C
C           IF THE TWO SEG'S HAVE THE SAME COMPONENT DESCRIPTOR, THERE IS
C           NO PROBLEM.  IF HOWEVER, THEY ARE DIFFERENT, IT IS NECESSARY
C           TO MERGE ONE INTO THE OTHER.  WE ASSUME THE CONVENTION OF ALWAYS
C           MERGING THE RIGHT INTO THE LEFT -- LEAVING THE LEFT.  THAT IS, THE
C           LEFT DOMINATES.  THE SINGLE EXCEPTION IS THAT IF ONE OF THE TWO
C           HAPPENS TO BE THE SPECIAL BACKGROUND COMPONENT, IT MUST DOMINATE.
C           THIS IS TO ENSURE THAT THE BACKGROUND IS NEVER DELETED (OR TO BE
C           MORE ACCURATE, RENAMED).  THE MERGING IS HANDLED BY THE CMERGE
C           ROUTINE.  WHEN WE DO SUCH MERGING, WE MUST ALSO FIX ALL OUTSTANDING
C           REFERENCES TO THE DELETED COMPONENT TO POINT, INSTEAD, TO THE
C           COMPONENT IN WHICH IT HAS BEEN MERGED.
C
C           TERMINATION:
C
C           THERE ARE THREE CASES TO CONSIDER HERE:
C
C           THE SIMPLEST CASE OF TERMINATION OCCURS WHEN OTHER SEGMENTS IN
C           THE ACTIVELINE STILL REFERENCE THE SAME COMPONENT.  THEN ONLY MERGING NEED
C           BE DONE SINCE ONLY ONE BRANCH OF THE DEVELOPING OBJECT HAS
C           TERMINATED. (THIS CONDITION WILL BE TRUE IF THE RIGHT AND LEFT
C           COMPONENTS ARE DIFFERENT.)
C
C           THE SECOND CASE OF TERMINATION OCCURS WHEN THERE ARE NO OTHER
C           REFERENCES AND THE OBJECT IS SURROUNDED BY THE BACKGROUND. THEN,
C           WE CAN OUTPUT THIS REGION. (THIS CONDITION WILL BE TRUE WHEN T
C           LEFT COMP = RIGHT COMP = BACKGROUND COMP.)
C
C           THE THIRD CASE OF TERMINATION OCCURS WHEN THERE ARE NO OTHER
C           REFERENCES AND THE OBJECT IS NOT SURROUNDED BY THE BACKGROUND.
C           THEN, WE CAN DO AN INTERIOR MERGE BY USING CMERGE TO IGNORE
C           THE DIFFERING COLORS AND MERGE THE INTERIOR INTO THE EXTERIOR,
C           KEEPING THE EXTERIOR COLOR.  THAT IS TO SAY, ALL INTERIOR HOLES IN
C           OBJECTS WILL BE ARBITRARILY ADDED TO THEIR CONTAINING OBJECTS.
C           OTHER ALTERNATIVES COULD BE USEFUL INSTEAD OF THIS -- WE COULD FOR
C           EXAMPLE REMEMBER ALL THE HOLES WITHIN AN OBJECT. (THIS CONDITION
C           OCCURS WHEN THE LEFT COMP = RIGHT COMP = BACKGROUND COMP.)
C
C*****************************************************************
C
C++++ PARAMETERS
C
      INTEGER*2 N,SMAX,CMAX,QMAX,RUNMAX,NULL,BLACK,WHITE
      REAL*4 PI,PI OVR 2,PI OVR 4,PI 3 OV 4
      COMMON /SHARE/N,SMAX,CMAX,QMAX,RUNMAX,NULL,BLACK,WHITE
      COMMON /SHARE/PI,PI OVR 2,PI OVR 4,PI 3 OV 4
C
C++++ ACTIVE LINE & SEGMENT DESCRIPTORS
C
      INTEGER ACTLIN
      INTEGER SCOLNO(50)
      INTEGER SCOMP(50)
      INTEGER SPREV(50)
      INTEGER SNEXT(50)
      COMMON /SHARE/ACTLIN,SCOLNO,SCOMP,SPREV,SNEXT
C
C++++ COMPONENT DESCRIPTORS
C
      INTEGER CX0(64)
      INTEGER CY0(64)
      INTEGER SUM1(64)
      INTEGER CNEXT(64)
      INTEGER CSON(64)
      INTEGER MASTER(64)
      COMMON /SHARE/CX0,CY0,SUM1,CNEXT,CSON,MASTER
C     COMMON /SHARE/SUMX,SUMY
C
C++++ RUN LENGTH CODE DATA
C
      INTEGER RUNCDE(50)
      COMMON /SHARE/RUNCDE
C
C++++ RENUM QUEUE DATA
```

```
C
        INTEGER QL(16)
        INTEGER QR(16)
        INTEGER QNEXT(16)
        INTEGER QPREV,QPTR,QFREE,QHEAD
        COMMON /SHARE/QL,QR,QNEXT
        COMMON /SHARE/QPREV,QPTR,QFREE,QHEAD
C
C++++ MISC GLOBAL VARIABLES
C
        INTEGER CURSEG,CBACK
        INTEGER SFREE,CFREE
        INTEGER THRESH,BKGRND,MINSIZ,XPOS
        INTEGER ROWEX(2),COLEX(2)
        INTEGER RELOLD,RELNEW
        COMMON /SHARE/CURSEG,CBACK,SFREE,CFREE,THRESH,BKGRND
        COMMON /SHARE/MINSIZ,XPOS
        COMMON /SHARE/ROWEX,COLEX
        COMMON /SHARE/RELOLD,RELNEW
C
C++++ RAMTEK DISPLAY
C
D       INTEGER COLOR(256)
D       COMMON /SHARE/COLOR
C
C*****************************************************************
C
        LOGICAL*1 OUTPIC(128,128)
        INTEGER*2 KEEPS,DROPS,KEEPC,DROPC
        INTEGER*2 TERMS,LEFTS,RIGHTS,TERMC,PTR
C
C++++ WHO IS BEING TERMINATED, WHO IS LEFT AND RIGHT NEIGHBOR
        TERMS=CURSEG
        TERMC=SCOMP(TERMS)
        IF (MASTER(TERMC) .NE. NULL) TERMC=MASTER(TERMC)
        LEFTS=SPREV(TERMS)
        RIGHTS=SNEXT(TERMS)
C
C++++ WHO WILL STAY AND WHO WILL GO (WHICH COMPONENT)
        IF (SCOMP(RIGHTS) .NE. CBACK) GO TO 10
                KEEPS=RIGHTS
                DROPS=LEFTS
                GO TO 20
10      CONTINUE
                KEEPS=LEFTS
                DROPS=RIGHTS
20      CONTINUE
C
        DROPC=SCOMP(DROPS)
        IF (MASTER(DROPC) .NE. NULL) DROPC=MASTER(DROPC)
        KEEPC=SCOMP(KEEPS)
        IF (MASTER(KEEPC) .NE. NULL) KEEPC=MASTER(KEEPC)
C
C++++ RECORD RELABELING OF OLD TO NEW SO EXTENTIONS RECEIVE OLD NUMBER
        IF (KEEPC .EQ. CBACK) GO TO 70
                RELOLD=SCOMP(RIGHTS)
                RELNEW=SCOMP(LEFTS)
70      CONTINUE
C
C++++ TYPE 1 TERMININATION (ONLY MERGE NEED BE DONE)
        IF (KEEPC .EQ. DROPC) GO TO 40
                CALL CMERGE(KEEPC,DROPC,0,OUTPIC)
C
C       THE FOLLOWING CODE IS COMMENTED OUT BECAUSE IT INTERFERES
C       WITH THE WRITING OUT OF THE REGION NUMBERS -- IT WOULD BE
C       DESIRABLE TO LEAVE THE CODE IN OTHERWISE
C               (FIX REFERENCES TO DROPC TO POINT TO KEEPC)
C               PTR=ACTLIN
C30             CONTINUE
C                       IF (PTR .EQ. NULL) GO TO 60
C                       IF (SCOMP(PTR) .EQ. DROPC)SCOMP(PTR)=KEEPC
C                       PTR=SNEXT(PTR)
C               GO TO 30
C
                GO TO 60
C
C++++ TYPE 2 TERMINATION (BACKGROUND SURROUNDS OBJECT)
40      IF (KEEPC .NE. CBACK) GO TO 50
C
                CALL CMERGE(CBACK,TERMC,1,OUTPIC)
                GO TO 60
C
C++++ TYPE 3 TERMINATION (OBJECT IMBEDDED IN ANOTHER OBJECT)
```

```
50      CONTINUE
C
        CALL RENUM(CX0(TERMC),CY0(TERMC),TERMC,KEEPC,OUTPIC)
        SUM1(KEEPC)=SUM1(KEEPC)+SUM1(TERMC)
        CNEXT(TERMC)=CFREE
        CFREE=TERMC
        GO TO 60
C
C++++ WRAP UP -- RELINK ACTIVE LINE WITHOUT CURSEG AND RIGHT SEGMENT
60      CONTINUE
        SNEXT(CURSEG)=SFREE
        SFREE=CURSEG
        CURSEG=SNEXT(RIGHTS)
        SNEXT(LEFTS)=CURSEG
        SPREV(CURSEG)=LEFTS
        SNEXT(RIGHTS)=SFREE
        SFREE=RIGHTS
        RETURN
        END
C       CMERGE.FOR
C
C       THE PURPOSE OF THIS SUBROUTINE IS TO MERGE TWO COMPONENT
C       DESCRIPTORS INTO ONE WHEN THE TWO REGIONS ARE FOUND TO
C       BE APPENDAGES OF THE SAME OBJECT (DURING SEGMENTATION)
C
        SUBROUTINE CMERGE(TARGET,AUX,INSIDE,OUTPIC)
C
C***************************************************************
C
C++++ PARAMETERS
C
        INTEGER*2 N,SMAX,CMAX,QMAX,RUNMAX,NULL,BLACK,WHITE
        REAL*4 PI,PI OVR 2,PI OVR 4,PI 3 OV 4
        COMMON /SHARE/N,SMAX,CMAX,QMAX,RUNMAX,NULL,BLACK,WHITE
        COMMON /SHARE/PI,PI OVR 2,PI OVR 4,PI 3 OV 4
C
C++++ ACTIVE LINE & SEGMENT DESCRIPTORS
C
        INTEGER ACTLIN
        INTEGER SCOLNO(50)
        INTEGER SCOMP(50)
        INTEGER SPREV(50)
        INTEGER SNEXT(50)
        COMMON /SHARE/ACTLIN,SCOLNO,SCOMP,SPREV,SNEXT
C
C++++ COMPONENT DESCRIPTORS
C
        INTEGER CX0(64)
        INTEGER CY0(64)
        INTEGER SUM1(64)
        INTEGER CNEXT(64)
        INTEGER CSON(64)
        INTEGER MASTER(64)
        COMMON /SHARE/CX0,CY0,SUM1,CNEXT,CSON,MASTER
C
C++++ RUN LENGTH CODE DATA
C
        INTEGER RUNCDE(50)
        COMMON /SHARE/RUNCDE
C
C++++ RENUM QUEUE DATA
C
        INTEGER QL(16)
        INTEGER QR(16)
        INTEGER QNEXT(16)
        INTEGER QPREV,QPTR,QFREE,QHEAD
        COMMON /SHARE/QL,QR,QNEXT
        COMMON /SHARE/QPREV,QPTR,QFREE,QHEAD
C
C++++ MISC GLOBAL VARIABLES
C
        INTEGER CURSEG,CBACK
        INTEGER SFREE,CFREE
        INTEGER THRESH,BKGRND,MINSIZ,XPOS
        INTEGER ROWEX(2),COLEX(2)
        INTEGER RELOLD,RELNEW
        COMMON /SHARE/CURSEG,CBACK,SFREE,CFREE,THRESH,BKGRND
        COMMON /SHARE/MINSIZ,XPOS
        COMMON /SHARE/ROWEX,COLEX
        COMMON /SHARE/RELOLD,RELNEW
C
C***************************************************************
```

```
C
        LOGICAL*1 OUTPIC(128,128)
        INTEGER TARGET,INSIDE,AUX,SAVE,P,P2,SIZE
C
        IF (INSIDE .EQ. 0) GO TO 50
C
C++++ OBJECT HAS TERMINATED SO SEE IF ITS BIG ENOUGH
C        TO WORRY ABOUT OR HAS SONS IN WHICH CASE ANY SIZE IS OK
C
        SIZE=0
        P=AUX
10      SIZE=SIZE+SUM1(P)
        IF (CSON(P) .NE. NULL)SIZE=MINSIZ
        IF (SIZE .GE. MINSIZ)GO TO 20
        P=CNEXT(P)
        IF (P .NE. NULL) GO TO 10
C
C++++ REGION TOO SMALL SO MERGE ALL BROTHERS INTO TARGET
C     OR TARGET=CBACK
C
1025    P=AUX
25      IF (P .EQ. NULL)GO TO 999
        CALL RENUM(CX0(P),CY0(P),P,TARGET,OUTPIC)
        IF (TARGET .NE. CBACK) SUM1(TARGET)=SUM1(TARGET)+SUM1(P)
        IF (TARGET .NE. CBACK) GO TO 37
        P2=ACTLIN
35      IF (P2 .EQ. NULL) GO TO 37
        IF (SCOMP(P2) .EQ. P)SCOMP(P2)=TARGET
        P2=SNEXT(P2)
        GO TO 35
37      CONTINUE
        SAVE=P
        P=CNEXT(P)
C       FREE COMPONENT DESC
        CNEXT(SAVE)=CFREE
        CFREE=SAVE
        GO TO 25
C
C++++ BIG ENOUGH REGION SO PROCEED
C
20      P=CNEXT(AUX)
21      IF (P .EQ. NULL) GO TO 22
        CALL RENUM(CX0(P),CY0(P),P,AUX,OUTPIC)
        SUM1(AUX)=SUM1(AUX)+SUM1(P)
C
C       PICK UP DESCENDANTS
C
        IF (CSON(P) .EQ. NULL) GO TO 27
        SAVE=CSON(AUX)
        P2=CSON(P)
23      IF (CNEXT(P2) .EQ. NULL) GO TO 24
        P2=CNEXT(P2)
        GO TO 23
24      CONTINUE
        CSON(AUX)=CSON(P)
        CNEXT(P2)=SAVE
C
27      IF (CX0(P) .GT. CX0(AUX)) GO TO 30
        IF ((CX0(P) .EQ. CX0(AUX)) .AND. (CY0(P) .GT. CY0(AUX)))
       1 GO TO 30
        CX0(AUX)=CX0(P)
        CY0(AUX)=CY0(P)
30      CONTINUE
C
        SAVE=P
        P=CNEXT(P)
C       FREE COMPONENT DESC
        CNEXT(SAVE)=CFREE
        CFREE=SAVE
        GO TO 21
C
C       LINK IN UPDATED AUX REGION AS A SON OF THE TARGET
C
22      CNEXT(AUX)=CSON(TARGET)
        CSON(TARGET)=AUX
        GO TO 999
C
C++++ 2 REGIONS HAVE MERGED SO LINK ON THE AUX DESCRIPTOR
C
50      IF (TARGET .EQ. CBACK) GO TO 1025
        IF (TARGET .EQ. AUX) GO TO 999
C
```

```
      IF ((MASTER(TARGET) .EQ. MASTER(AUX)) .AND.
     1 (MASTER(TARGET) .NE. NULL)) GO TO 999
C
      SAVE=CNEXT(TARGET)
      CNEXT(TARGET)=AUX
      P=AUX
C
      P2=TARGET
      IF (MASTER(TARGET) .NE. NULL) P2=MASTER(TARGET)
60    MASTER(P)=P2
C
      IF (CNEXT(P) .EQ. NULL) GO TO 70
      P=CNEXT(P)
      GO TO 60
70    CNEXT(P)=SAVE
C
C
999   RETURN
      END
C     RENUM.FOR
C
C     THE PURPOSE OF THIS SUBROUTINE IS TO RENUMBER A SUB-REGION
C     WITH A MINIMUM EXCURSION THROUGH THE ARRAY
C
      SUBROUTINE RENUM(ROW,COL,OLD,NEW,OUTPIC)
      INTEGER ROW,COL,OLD,NEW,SEED
C
C***************************************************************
C
C++++ PARAMETERS
C
      INTEGER*2 N,SMAX,CMAX,QMAX,RUNMAX,NULL,BLACK,WHITE
      REAL*4 PI,PI OVR 2,PI OVR 4,PI 3 OV 4
      COMMON /SHARE/N,SMAX,CMAX,QMAX,RUNMAX,NULL,BLACK,WHITE
      COMMON /SHARE/PI,PI OVR 2,PI OVR 4,PI 3 OV 4
C
C++++ ACTIVE LINE & SEGMENT DESCRIPTORS
C
      INTEGER ACTLIN
      INTEGER SCOLNO(50)
      INTEGER SCOMP(50)
      INTEGER SPREV(50)
      INTEGER SNEXT(50)
      COMMON /SHARE/ACTLIN,SCOLNO,SCOMP,SPREV,SNEXT
C
C++++ COMPONENT DESCRIPTORS
C
      INTEGER CX0(64)
      INTEGER CY0(64)
      INTEGER SUM1(64)
      INTEGER CNEXT(64)
      INTEGER CSON(64)
      INTEGER MASTER(64)
      COMMON /SHARE/CX0,CY0,SUM1,CNEXT,CSON,MASTER
      COMMON /SHARE/SUMX,SUMY
C
C++++ RUN LENGTH CODE DATA
C
      INTEGER RUNCDE(50)
      COMMON /SHARE/RUNCDE
C
C++++ RENUM QUEUE DATA
C
      INTEGER QL(16)
      INTEGER QR(16)
      INTEGER QNEXT(16)
      INTEGER QPREV,QPTR,QFREE,QHEAD
      COMMON /SHARE/QL,QR,QNEXT
      COMMON /SHARE/QPREV,QPTR,QFREE,QHEAD
C
C++++ MISC GLOBAL VARIABLES
C
      INTEGER CURSEG,CBACK
      INTEGER SFREE,CFREE
      INTEGER THRESH,BKGRND,MINSIZ,XPOS
      INTEGER ROWEX(2),COLEX(2)
      INTEGER RELOLD,RELNEW
      COMMON /SHARE/CURSEG,CBACK,SFREE,CFREE,THRESH,BKGRND
      COMMON /SHARE/MINSIZ,XPOS
      COMMON /SHARE/ROWEX,COLEX
      COMMON /SHARE/RELOLD,RELNEW
C
C
```

```
       LOGICAL*1 OUTPIC(128,128)
C
       INTEGER CFLAG,LEFT,RIGHT
       INTEGER LBND,RBND,LBND2,RBND2,I
C
C      CHECK LEGALITY OF RENUM CALL
D      IF (OUTPIC(COL,ROW) .NE. OLD) TYPE 100,
D     1 ROW,COL,OLD,NEW,OUTPIC(COL,ROW)
D100   FORMAT(' RENUM ERROR:',5I7)
C
C      INITIALIZE QUEUE HEADER AND SEED NODE
       QFREE=3
       QHEAD=1
       QNEXT(1)=2
       QL(2)=COL
       QR(2)=COL
       QNEXT(2)=NULL
C
C      LOOP FOR ALL POSSIBLE CONTINUATION ROWS
       DO 90 I=ROW,XPOS-1
C
C      SET UP FOR FIRST NODE IN QUEUE
       QPREV=1
       QPTR=QNEXT(1)
C
C      VERIFY THAT THERE IS A NODE TO CONTINUE
       IF (QPTR .EQ. NULL) GO TO 999
C
C      LOOK FOR CONTINUATION OF QPTR SEGMENT
10     LBND2=QL(QPTR)-1
       RBND= QR(QPTR)
       RBND2=LBND2
C
C      FLAG THE FACT THAT THIS SEGMENT NOT CONTINUED YET
       CFLAG=0
C
C      FIRST SEE IF THERE COULD BE CONTINUATION TO LEFT
       IF (COLEX(1) .GT. LBND2) GO TO 20
       IF (OUTPIC(LBND2,I) .NE. OLD) GO TO 20
C
C      FOLLOW CONTINUATION BACK TO LEFT EDGE
       DO 11 LBND=LBND2,COLEX(1),-1
             IF (OUTPIC(LBND,I) .NE. OLD) GO TO 12
             OUTPIC(LBND,I)=NEW
11     CONTINUE
C
C      WE HAVE CONTINUATION TO LEFT--RECORD FACT AND EDGE
12     LBND=LBND+1
       CFLAG=1
C
C      FIND RIGHT EDGE OF SEGMENT
       DO 13 RBND2=LBND2+1,COLEX(2)
             IF (OUTPIC(RBND2,I) .NE. OLD) GO TO 14
             OUTPIC(RBND2,I)=NEW
13     CONTINUE
C
C      RECORD RIGHT EDGE OF THIS SEGMENT INTO NODE ON QUEUE
14     RBND2=RBND2-1
       QL(QPTR)=LBND
       QR(QPTR)=RBND2
C
C      CHECK IF THERE COULD BE NEW FRAGMENTS
20     IF (RBND2 .GE. RBND) GO TO 80
C
C      LOOK FOR LEFT EDGE
       DO 22 LEFT=RBND2+1,RBND
             IF (OUTPIC(LEFT,I) .EQ. OLD) GO TO 23
22     CONTINUE
C
C      NO MORE CONTINUATIONS SO PROCEED TO NEXT QUEUE NODE
       GO TO 80
C
C      WE HAVE A LEFT EDGE, FIND RIGHT EDGE
23     DO 24 RIGHT=LEFT,COLEX(2)
             IF (OUTPIC(RIGHT,I) .NE. OLD) GO TO 25
             OUTPIC(RIGHT,I)=NEW
24     CONTINUE
C
C      OK, GOT SEGMENT, HAS QUEUED SEGMENT ALREADY BEEN CONTINUED
25     IF (CFLAG .EQ. 0) GO TO 26
C
C      NO, SO LINK IN A NEW NODE IF AVAILABLE
C      IF NOT, LENGTHEN QUEUED SEGMENT BY UPDATING "QR" ONLY
```

```
              IF (QFREE .GT. QMAX) GO TO 27
                    QNEXT(QFREE)=QNEXT(QPTR)
                    QNEXT(QPTR)=QFREE
                    QPREV=QPTR
                    QPTR=QFREE
                    QFREE=QFREE+1
C
C       RECORD BOUND OF CONTINUATION SEGMENT
26      CFLAG=1
        QL(QPTR)=LEFT
27      QR(QPTR)=RIGHT-1
C
C       RECORD RIGHT MOST EDGE AND LOOK FOR MORE OFF OF SAME SEGMENT
        RBND2=RIGHT-1
        GO TO 20
C
C       NO MORE EXTENTIONS SO SEE IF ANY WERE FOUND AT ALL
80      IF (CFLAG .EQ. 1) GO TO 85
        QNEXT(QPREV)=QNEXT(QPTR)
        QPTR=QNEXT(QPREV)
        IF (QPTR .NE. NULL) GO TO 10
        GO TO 90
C
C       PICK UP NEXT SEGMENT FROM QUEUE
85      QPREV=QNEXT(QPREV)
        IF (QPREV .EQ. NULL) GO TO 90
        QPTR=QNEXT(QPREV)
        IF (QPTR .NE. NULL) GO TO 10
C
90      CONTINUE
C
999     RETURN

END
C
        PERIPH.FOR
C
C       SUBROUTINE TO EXTRACT BOUNDARY POINTS FROM A LABELED
C       BINARY REGION
C
C       IT IS ASSUMED THAT THE REGION BE AN INTERIOR REGION
C       WHICH DOES NOT TOUCH THE BOUNDARY
C
C       PIXELS ARE CONSIDERED TO BE AT THE CENTER OF THE AREA
C       WHICH THEY COVER.  EDGES ARE THEREFORE ALWAYS LOCATED
C       ON A HALF PIXEL BOUNDARY IN EITHER THE X OR Y DIRECTION.
C       NOTE THAT THE X DIRECTION IS DOWN AND THE Y DIRECTION
C       IS TO THE RIGHT.
C
C       DIRECTION NUMBERS:
C
C              <-3--
C              !   ¬
C              4   2             DIRECTIONS POINT CCW AROUND REGIONS
C              !   !
C              --1->
C
C              1: +Y OR INCREASING COLUMN
C              2: -X OR DECREASING ROW
C              3: -Y OR DECREASING COLUMN
C              4: +X OR INCREASING ROW
C
C       GIVEN THAT YOU STANDING ON AN EDGE AND WONDER WHICH DIRECTION
C       YOU SHOULD TRY NEXT, USE THE FOLLOWING TABLE:
C
C               TRY1    TRY2    TRY3
C             +-------+-------+-------+
C       D=1   !   4   !   1   !   2   !
C             +-------+-------+-------+
C       D=2   !   1   !   2   !   3   !
C             +-------+-------+-------+
C       D=3   !   2   !   3   !   4   !
C             +-------+-------+-------+
C       D=4   !   3   !   4   !   1   !
C             +-------+-------+-------+
C
        SUBROUTINE PERIPH(PIC,XSEED,YSEED,X,Y,SKIP,KMAX,PTSREC)
C
        LOGICAL*1 PIC(128,128)
        INTEGER*2 XSEED,YSEED,SKIP,KMAX
        INTEGER*2 X(1),Y(1)
        LOGICAL*1 LABEL
        INTEGER*2 XP,YP
```

```fortran
      INTEGER*2 PTSFND,PTSREC
      INTEGER*2 I,J,D,TRY
      INTEGER*2 ILOC(4),JLOC(4)
      INTEGER*2 NEWD(4,3) ! NEW DIRECTION
      INTEGER*2 IX(4,3),JX(4,3) !TEST INCREMENTS
      INTEGER*2 OLD,DROP
      DATA ILOC,JLOC/1,0,-1,0,0,1,0,-1/
      DATA NEWD/4,1,2,3,1,2,3,4,2,3,4,1/
      DATA IX/1,-1,-1,1,0,-1,0,1,0,0,0,0/
      DATA JX/1,1,-1,-1,1,0,-1,0,0,0,0,0/
C
C++++ LABEL IS THE MARKER ASSIGNED TO PIXELS IN THE REGION BEING TRACED
      LABEL=PIC(YSEED,XSEED)
C
C++++ THE SEED PIXEL IS DEFINED TO BE ON AN UPPER,LEFT CORNER
C         OF THE OBJECT; VERIFY THAT THE PIXEL TO THE LEFT IS IN
C         FACT OFF THE OBJECT. THIS RESTRICTION COULD BE RELAXED
C         BY INSTEAD SCANNING ACCROSS THE OBJECT TO THE LEFT UNTIL
C         A BORDER IS HIT.
C
      IF (PIC(YSEED-1,XSEED) .NE. LABEL) GO TO 10
            PTSREC=0
            GO TO 999
10    CONTINUE
C
C++++ INITIALIZE BOUNDARY POINTS ARRAY AND DIRECTION
      X(1)=2*XSEED
      Y(1)=2*YSEED-1
      D=4
      I=XSEED
      J=YSEED
C
C++++ INITIALIZE POINTS FOUND AND POINTS RECORDED
      PTSFND=1
      PTSREC=1
C
C++++ FOLLOW BOUNDARY -- LOOP HEAD
20    DO 30 TRY=1,3
            IF (PIC(J+JX(D,TRY),I+IX(D,TRY)) .EQ. LABEL)
     1          GO TO 40
30    CONTINUE
C
      STOP 'BOUND: FOLLOW ERROR'
C
40    PTSFND=PTSFND+1
C
C++++ GET COORDINATES FOR NEW BASE PIXEL AND DIRECTION
      I=I+IX(D,TRY)
      J=J+JX(D,TRY)
      D=NEWD(D,TRY)
C
C++++ GET NEW EDGE POINT
      XP=2*I+ILOC(D)
      YP=2*J+JLOC(D)
C
C++++ HAVE WE GOTTEN BACK TO THE START POINT YET
      IF (XP .NE. X(1)) GO TO 50
      IF (YP .EQ. Y(1)) GO TO 999
50    CONTINUE
C
C++++ SHOULD WE RECORD THIS POINT OR SKIP IT?
      IF (MOD(PTSFND,SKIP) .NE. 1) GO TO 20
            PTSREC=PTSREC+1
            X(PTSREC)=XP
            Y(PTSREC)=YP
            IF (PTSREC .LT. KMAX) GO TO 20
C
C++++ WE'RE OUT OF SPACE FOR EDGE POINTS, RECOVER BY COLLAPSING LIST
      PTSREC=1
      DO 60 OLD=3,KMAX,2
            PTSREC=PTSREC+1
            DROP=OLD-1
            X(PTSREC)=X(OLD)
            Y(PTSREC)=Y(OLD)
60    CONTINUE
C
C++++ LOOP BACK FOR THE REST OF THE POINTS
      GO TO 20
C
999   RETURN
      END
```

```
C       LSQCH.FOR
C
C       SUBROUTINE TO FIT A LEAST SQUARES CONIC TO GIVEN POINTS
C       X(I), Y(I) FOR I=1,N
C
        SUBROUTINE LSQCH(REPLY,X,Y,N,ORG,AX,CS,P,PATCH,SETANG)
        INTEGER SETANG
        INTEGER REPLY
        INTEGER X(1),Y(1)
        REAL ORG(2),AX(2),CS(2)
        REAL A(5,7),Q(6)
        REAL P(5)
        INTEGER IPS(5)
        INTEGER FLAG
        REAL BASE(2)
        REAL B(5),C(5)
        REAL XK,YK
        REAL ORG2,BASE2
        EQUIVALENCE (A(1,6),B(1))
        EQUIVALENCE (A(1,7),C(1))
        REPLY=1
        JL=6
        IF (SETANG .NE. 0) JL=7
        Q(6)=1
C
C       TRANSLATE INPUT POINTS--FIND CENTROID
        BASE(1)=0.
        BASE(2)=0.
C
        DO 10 I=1,N
                BASE(1)=BASE(1)+X(I)/2.0
                BASE(2)=BASE(2)+Y(I)/2.0
10      CONTINUE
C
        BASE(1)=BASE(1)/N
        BASE(2)=BASE(2)/N
C
30      CONTINUE
C
C       INITIALIZE AND CONSTRUCT A-B MATRIX
        DO 160 I=1,5
                DO 160 J=I,JL
160     A(I,J)=0.
        DO 300 K=1,N
                XK=X(K)/2.0-BASE(1)
                YK=Y(K)/2.0-BASE(2)
                Q(1)=XK**2
                Q(2)=XK*YK
                Q(3)=YK**2
                Q(4)=XK
                Q(5)=YK
                DO 300 I=1,5
                        DO 300 J=I,6
                                A(I,J)=A(I,J)+Q(I)*Q(J)
300     CONTINUE
        DO 310 J=2,5
                IL=J-1
                DO 310 I=1,IL
                        A(J,I)=A(I,J)
310     CONTINUE
C
C       SOLVE THE LINEAR SYSTEM
        CALL DECOMP(J,5,A,A,IPS)
        REPLY=J
        IF (REPLY .NE. 1)RETURN
        CALL SOLVE(5,A,B,P,IPS)
C
        IF (SETANG .EQ. 0) GO TO 330
                C(3)=2.*CS(1)*CS(2)
                C(2)=CS(1)**2-CS(2)**2
                C(1)=-C(3)
                CALL SOLVE(5,A,C,Q,IPS)
                CQ=C(1)*Q(1)+C(2)*Q(2)+C(3)*Q(3)
                F=(C(1)*P(1)+C(2)*P(2)+C(3)*P(3))/CQ
                DO 320 I=1,5
                        P(I)=P(I)-F*Q(I)
320             CONTINUE
330     CONTINUE
C
C       HALVE SOME OF THE PARAMETERS
        P(2)=P(2)/2.
        P(4)=P(4)/2.
        P(5)=P(5)/2.
```

```fortran
C
C     STORE:
C       X0,Y0 IN ORG
C       ALPHA,BETA IN AX
C       C,S IN CS
      DELTA=P(1)*P(3)-P(2)**2
      ORG(1)=(P(2)*P(5)-P(3)*P(4))/DELTA
      ORG(2)=(P(2)*P(4)-P(1)*P(5))/DELTA
      F=1.-P(4)*ORG(1)-P(5)*ORG(2)
      D=(P(1)-P(3))/2.
      R=SQRT(D**2+P(2)**2)
      S=(P(1)+P(3))/2.
      IF (S .LT. 0.) R=-R
C
C     CHECK TO MAKE SURE DATA FITTED AN ELLIPSE
      IF (ABS(S) .GT. ABS(R))GO TO 40
            REPLY=100
            RETURN
40    CONTINUE
      AX(1)=SQRT(F/(S-R))
      AX(2)=SQRT(F/(S+R))
      IF (SETANG .NE. 0) GO TO 401
      CS(1)=SQRT(0.5*(1.-D/R))
      CS(2)=SQRT(0.5*(1.+D/R))
C
      IF (P(2) .GT. 0.) CS(2)=-CS(2)
401   CONTINUE
C
C     FIX UP CENTERS
      ORG(1)=ORG(1)+BASE(1)
      ORG(2)=ORG(2)+BASE(2)
C
C
C     PATCH FOLLOWS FOR COMPILER ERROR ON ABOVE LINE
      ORG2=ORG(2)
      BASE2=BASE(2)
      PATCH=ORG2+BASE2
C
C
C     END OF PATCH
C
C     USE P(4) TO RETURN F VARIABLE TO CALLER
      P(4)=F
C
      RETURN
      END
C     ECON.FOR
C
C     SUBROUTINE TO EVALUATE CONIC
C
C     GIVEN:  THE ELLIPSE DEFINED BY ORIGIN AT (ORG(1),ORG(2))
C             WITH THE MAJOR AND MINOR RADII OF AX(1) AND
C             AX(2) AND THE COS AND SIN OF THE MAJOR AXIS ANGLE
C             OF CS(1) AND CS(2), THEN...
C     FIND:   THE X AND Y COORDINATES OF A POINT ON THE ELLIPSE
C             AT T RADIANS RELATIVE TO THE MAJOR AXIS ANGLE.
C
      SUBROUTINE ECON(ORG,AX,CS,T,X,Y)
      REAL ORG(2),AX(2),CS(2)
      XX=AX(1)*COS(T)
      YY=AX(2)*SIN(T)
      X=ORG(1)+XX*CS(1)-YY*CS(2)
      Y=ORG(2)+XX*CS(2)+YY*CS(1)
      RETURN
      END
C     DECOMP.FOR
C
C     DECOMPOSITION OF LINEAR SYSTEM OF EQUATIONS
C
      SUBROUTINE DECOMP(REPLY,NN,A,UL,IPS)
      INTEGER*4 REPLY
      REAL*4 A(5,5),UL(5,5),SCALES(5)
      REAL*4 BIG,EM,PIVOT,ROWNRM,SIZE
      INTEGER IPS(5)
      REPLY=1
      N=NN
C
C     INITIALIZE IPS,UL, AND SCALES
      DO 5 I=1,N
            IPS(I)=I
            ROWNRM=0.0
            DO 2 J=1,N
                  UL(I,J)=A(I,J)
                  IF (ROWNRM .GE. ABS(UL(I,J)))GO TO 2
                  ROWNRM=ABS(UL(I,J))
```

```fortran
2         CONTINUE
          IF (ROWNRM .EQ. 0.)GO TO 4
3         SCALES(I)=1.0/ROWNRM
          GO TO 5
4     CONTINUE
C
C         MATRIX HAS A ZERO ROW
          REPLY=2
          SCALES(I)=0.0
5     CONTINUE
C
C     GAUSSIAN ELIMINATION WITH PARTIAL PIVOTING
      NM1=N-1
      DO 17 K=1,NM1
          BIG=0.0
          DO 11 I=K,N
              IP=IPS(I)
              SIZE=ABS(UL(IP,K))*SCALES(IP)
              IF (SIZE .LE. BIG) GO TO 11
                  BIG=SIZE
                  IDXPIV=I
11        CONTINUE
          IF (BIG .NE. 0)GO TO 13
C
C             MATRIX IS SINGULAR
              REPLY=3
              GO TO 17
13        IF (IDXPIV .EQ. K) GO TO 15
              J=IPS(K)
              IPS(K)=IPS(IDXPIV)
              IPS(IDXPIV)=J
15        KP=IPS(K)
          PIVOT=UL(KP,K)
          KP1=K+1
          DO 16 I=KP1,N
              IP=IPS(I)
              EM=-UL(IP,K)/PIVOT
              UL(IP,K)=-EM
              DO 16 J=KP1,N
                  UL(IP,J)=UL(IP,J)+EM*UL(KP,J)
16        CONTINUE
17    CONTINUE
      KP=IPS(N)
      IF (UL(KP,N) .NE. 0.) GO TO 19
C
C         MATRIX IS SINGULAR
          REPLY=4
19    RETURN
      END
C     SOLVE.FOR
C
C     SOLUTION OF DECOMPOSED LINEAR SYSTEM OF EQUATIONS
C
      SUBROUTINE SOLVE(NN,UL,B,X,IPS)
      REAL*4 UL(5,5),B(5),X(5),SUM
      INTEGER IPS(5)
      N=NN
      NP1=N+1
C
      IP=IPS(1)
      X(1)=B(IP)
      DO 2 I=2,N
          IP=IPS(I)
          IM1=I-1
          SUM=0.0
          DO 1 J=1,IM1
1             SUM=SUM+UL(IP,J)*X(J)
2     X(I)=B(IP)-SUM
C
      IP=IPS(N)
      X(N)=X(N)/UL(IP,N)
      DO 4 IBACK=2,N
          I=NP1-IBACK
C         I GOES: (N-1),(N-2),...,1
          IP=IPS(I)
          IP1=I+1
          SUM=0.0
          DO 3 J=IP1,N
3             SUM=SUM+UL(IP,J)*X(J)
4     X(I)=(X(I)-SUM)/UL(IP,I)
      RETURN
      END
```

```
C       ERRANL.FOR
C
C       THE PURPOSE OF THIS SUBROUTINE IS TO COMPUTE THE
C       PERCENTAGE ERROR FOR ALL THE POINTS IN (XP,YP)
C       RELATIVE TO THE ELLIPSE DEFINED BY ORG,AX,CS.
C       ALL POINTS WHICH EXCEED THRESH ARE TO BE DELETED
C       FROM THE LIST WITH N APPROPRIATELY REDUCED.
C       RMSERR REFLECTS THE COMPOSITE VALUE
C       FOR ALL INPUT POINTS
C
        SUBROUTINE ERRANL(ORG,AX,CS,P,XP,YP,N,IOUT,THRESH,RMSERR)
        REAL*4 P(5)
        REAL*4 ORG(2),AX(2),CS(2)
        REAL*4 THRESH,PCTERR
        REAL*4 RMSERR
        INTEGER*2 XP(1),YP(1)
        INTEGER*2 N,KEEP,I,IOUT
        REAL*4 SUM,SUM2,RISE,RUN,D,T,E,X,Y
C
        SUM2=0.0
        KEEP=1
C
        DO 100 I=1,N
            RISE=(YP(I)/2.0)-ORG(2)
            RUN =(XP(I)/2.0)-ORG(1)
            D=SQRT(RISE**2 + RUN**2)
C
C       CALCULATE ELLIPSE POINT NEAREST DATA POINT
        T=SQRT(P(4)/(P(1)*RUN**2+2.*P(2)*RISE*RUN+P(3)*RISE**2))
        X=ORG(1)+RUN*T
        Y=ORG(2)+RISE*T
            E=SQRT((X-ORG(1))**2 + (Y-ORG(2))**2)
            PCTERR=D/E*100.0-100.0
            SUM2=SUM2+PCTERR**2
            IF (ABS(PCTERR) .LE. THRESH) GO TO 98
                IF (THRESH .EQ. 0) GO TO 98
                GO TO 100
98              CONTINUE
                XP(KEEP)=XP(I)
                YP(KEEP)=YP(I)
                KEEP=KEEP+1
100     CONTINUE
C
C++++ THE FOLLOWING STATEMENT REWRITTEN DUE TO A COMPILER ERROR
C       RMSERR=SQRT(SUM2/N)
C++++ REVISED VERSION FOLLOWS...
        TEMP=SUM2/N
        TEMP=SQRT(TEMP)
        RMSERR=TEMP
C++++ ...END OF REVISION
C
C++++ TYPE
        IF (IOUT .EQ. 1) GO TO 30
            TYPE 201,RMSERR
            TYPE 203,N,(N-KEEP+1)
30      CONTINUE
C
201     FORMAT(' RMS % ERROR=',F5.1)
203     FORMAT(' IN=',I3,' DROP=',I3)
C
        N=KEEP-1
        RETURN
        END
C       CHORD.FOR
C
C       SUBROUTINE TO CALCULATE CHORD STRAINS
C
        SUBROUTINE CHORD(ORG,CS,REG,PIC,ROWEXT,
     1      COLEXT,MAJCH,MINCH)
        REAL*4 ORG(2),CS(2),MAJCH,MINCH,C,S,X(4),Y(4)
        INTEGER*2 I,J,K,L,IX(4),IY(4),XT,YT,XF,YF
        INTEGER*2 XD,YD,XINC,YINC
        INTEGER*2 XS,YS,XDIF,YDIF,ABSM0,ABSM1
        INTEGER*2 ROWEXT(2),COLEXT(2)
        LOGICAL*1 REG,PIC(128,128)
C
C
```

```
C         +....1...........+
C         .      .         .
C         .      .         .
C         .    *--         .
C         .    -----       .
C         .    ------*..4
C         .   ..*------    .
C         .    ------      .
C         3.         --*   .
C         .      .         .
C         .      .         .
C         +..........2....+
C
C
C        GIVEN THE ELLIPSE INDICATED ABOVE BY THE DASH
C        SYMBOLS -- FIND THE FOUR NUMBERED POINTS WHERE
C        THE MAJOR AND MINOR AXES CROSS THE PICTURE
C        BORDERS -- THEN, SCAN BACK ALONG THE AXES UNTIL
C        THE STARRED POINTS ON THE TARGET PATTERN ARE
C        LOCATED -- THE DISTANCES BETWEEN THE STARRED
C        PAIRS CAPTURE THE "CHORD" STRAIN DESIRED.
C
C
C++++ GET WINDOW CROSSINGS FOR THE MAJOR AND MINOR AXIS
        C=CS(1)
        S=CS(2)
C
        DO 100 I=1,2
            K=1
            DO 90 J=1,2
                IF (ABS(C) .LT. 0.005) GO TO 80
C
                L=(I-1)*2+K
                IY(L)=S/C*(ROWEXT(J)-ORG(1))+ORG(2)+0.5
C
C       EXPANSION OF MIXED MODE EXPRESSION FOLLOWS
C       (SUSPECTED COMPILER BUG)
C
                TEMP=ROWEXT(J)
                TEMP=S/C*(TEMP-ORG(1))+ORG(2)+0.5
                IY(L)=TEMP
C
                IF ((IY(L) .LT. COLEXT(1)) .OR.
     1              (IY(L) .GT. COLEXT(2))) GO TO 70
C
                IX(L)=ROWEXT(J)
                K=K+1
                IF (K .EQ. 3) GO TO 99
70              CONTINUE
C
80              CONTINUE
C
                IF (ABS(S) .LT. 0.005) GO TO 90
C
                L=(I-1)*2+K
                IX(L)=C/S*(COLEXT(J)-ORG(2))+ORG(1)+0.5
C
C       EXPANSION OF MIXED MODE EXPRESSION FOLLOWS
C
                TEMP=COLEXT(J)
                TEMP=C/S*(TEMP-ORG(2))+ORG(1)+0.5
                IX(L)=TEMP
C
                IF ((IX(L) .LT. ROWEXT(1)) .OR.
     1              (IX(L) .GT. ROWEXT(2))) GO TO 85
C
                IY(L)=COLEXT(J)
                IF (IX(L) .NE. ROWEXT(J)) K=K+1
                IF (K .EQ. 3) GO TO 99
85              CONTINUE
90          CONTINUE
99          C=-CS(2)
            S=CS(1)
100     CONTINUE
C
C++++ FIND 4 POINTS ON PATTERN CLOSEST TO 4 CROSSING POINTS
C
        DO 200 I=1,3,2
            K=I+1
            DO 210 J=1,2
                L=I+J-1
C
```

```
                        XT=IX(L)
                        YT=IY(L)
                        XS=XT
                        YS=YT
                        XF=IX(K)
                        YF=IY(K)
C
                        ABSM0=10000
                        IF ((XF-XS) .NE. 0)
     1                  ABSM0=IABS((100*(YF-YS))/(XF-XS))
                        XD=ISIGN(1,XF-XS)
                        YD=ISIGN(1,YF-YS)
                        IF ((XF-XS) .EQ. 0)XD=0
                        IF ((YF-YS) .EQ. 0)YD=0
C
                        ABSM1=ABSM0
                        GO TO 10
C
5
                        IF ((XT .EQ. XF) .AND. (YT .EQ. YF))
     1                     GO TO 50
C
                        ABSM1=10000
                        YDIF=YT-YS
                        XDIF=XT-XS
C
C
                        IF (XDIF .NE. 0)ABSM1=IABS((100*YDIF)/XDIF)
10
                        XINC=0
                        YINC=0
C
                        IF (ABSM1 - ABSM0) 11,12,13
C
C                       ABS SLOPE TOO SMALL
C
11                      YINC=YD
                        GO TO 30
C
C                       SLOPE JUST RIGHT
C
12                      YINC=YD
C                       XINC=XD
C                       GO TO 30
C
C
C                       ABS SLOPE TOO BIG
C
13                      XINC=XD
C
30      CONTINUE
C
C                       CHECK BECAUSE OF COMPILER ERROR
                        IF ((YT+YINC) .LT. COLEXT(1)) GO TO 501
                        IF ((YT+YINC) .GT. COLEXT(2)) GO TO 501
                        IF ((XT+XINC) .LT. ROWEXT(1)) GO TO 501
                        IF ((XT+XINC) .LE. ROWEXT(2)) GO TO 502
501     CONTINUE
        MAJCH=0.
        MINCH=0.
        RETURN
502     CONTINUE
C
C                       END OF CHECK BECAUSE OF COMPILER ERROR
                        IF (PIC(YT+YINC,XT+XINC) .NE. REG)
     1                     GO TO 40
C
                        X(L)=XT+XINC/2.0
                        Y(L)=YT+YINC/2.0
                        GO TO 60
C
40                      CONTINUE
                              XT=XT+XINC
                              YT=YT+YINC
                              GO TO 5
50                      CONTINUE
                              Y(L)=0.
                              X(L)=0.
60              K=L
210             CONTINUE
200     CONTINUE
C
C++++ COMPUTE MAJOR AND MINOR CHORD STRAIN IN PIXELS
C
        MAJCH=SQRT((X(1)-X(2))**2+
     1             (Y(1)-Y(2))**2)/2.0
```

```
        MINCH=SQRT((X(3)-X(4))**2+
   1           (Y(3)-Y(4))**2)/2.
C
        RETURN
        END
;       STNDBY.MAC
;
;       STRAIN SYSTEM STANDBY ROUTINE
;
;       THE PURPOSE OF THIS PROGRAM IS TO BUSY WAIT UNTIL
;       STAT-A IS CLEARED ON THE DRV11-B. IT THEN RETURNS
;       A ONE WORD REPLY CODE WHICH CONTAINS 2000 OCTAL IF
;       STAT-B IS SET OR 0 IF IT IS NOT SET.
;
;       FORTRAN CALLING SEQUENCE:
;
;               CALL STNDBY(REPLY)
;               REPLY IS INTEGER*2
;
        .PSECT STNDBY,RW,I
        .IDENT /780428/
        .GLOBL STNDBY
        CSR=172414
        STATA=4000
;       STATB=2000
;       STATC=1000
        NOTB=175777
;
;       BUSY WAIT UNTIL STAT A CLEARED
;
STNDBY: BIT #STATA,CSR
        BNE STNDBY
;
;       RETURN STAT B INDICATOR ONLY
;
        MOV CSR,R0
        BIC #NOTB,R0
        MOV R0,@2(R5)
        RTS PC
;
        .END STNDBY
;       GETPIC.MAC
;
;       GE CAMERA PICTURE ACQUISITION SUBROUTINE
;
;       THIS PROGRAM INITIATES THE TRANSFER OF 4096 WORDS THROUGH
;       THE DRV11-B DMA PORT.  THE DATA REPRESENTS THE 128 BY 128
;       IMAGE DIGITIZED FROM THE GE TN2200 SOLID STATE CAMERA. THE
;       PIXELS ARE PACKED ON 4 BIT BOUNDARIES (4 PER WORD) AND
;       STORED IN ROW MAJOR ORDER.
;
;               WORD 1: PIXEL4,PIXEL3,PIXEL2,PIXEL1
;               WORD 2: PIXEL8,PIXEL7,PIXEL6,PIXEL5
;                         .
;                         .
;                         .
;               WORD 4096: PIXEL16384,PIXEL16383,PIXEL16382,PIXEL16381
;
;       THE DRV11-B ADDRESS REGISTERS BEGIN AT ADDRESS 772410 AND ITS
;       INTERRUPT VECTOR IS AT 124.  THIS MEANS SWITCH S1 ON THE M7950
;       SHOULD BE SET TO OCTAL 1241 AND SWITCH S2 SHOULD BE SET
;       TO  OCTAL 025.
;
;       THIS SUBROUTINE USES THE MARK TIME DIRECTIVE TO PROVIDE A ONE
;       SECOND TIME OUT ON THE DMA OPERATION.  THIS REQUIRES
;       THAT TIMER SUPPORT BE REQUESTED DURING SYSGEN IF THE RT-11
;       SINGLE JOB MONITOR IS TO BE USED.
;
;       FORTRAN CALLING SEQUENCE:
;
;               CALL GETPIC(REPLY,PIC)
;
;                       REPLY: INTEGER*2 SCALAR
;                       PIC:   LOGICAL*1 ARRAY (128,128)
;
;       REPLY CODES:
;
;               1:      SUCCESS
;               2:      TIME OUT ERROR
;               3:      DMA ERROR, NONEXISTANT MEMORY
;               4:      DMA ERROR, ATTENTION
;               5:      DMA ERROR, UNKNOWN
;               7:      MARK TIME FAILURE
```

```
;                8:      SYNCH DIRECTIVE FAILURE
        .SBTTL ENTRY & INITIALIZATION OF INTERRUPT VECTOR
        .PAGE
        .PSECT  GETPIC,RW,I
        .IDENT  /780606/
        .GLOBL  GETPIC
        .MCALL  .MRKT,.CMKT,.INTEN,.SYNCH
;
        WCR=172410
        BAR=172412
        CSR=172414
        IDBR=172416
        ODBR=172416

INTVEC=124
;
        DRBGO=101
;
GETPIC: MOV     2(R5),REPLY     ;GET ARGUMENT ADDRESSES
        MOV     4(R5),PIC
        MOV     4(R5),BAR       ;SET DRV11-B BUFFER ADDRESS
        CLR     @2(R5)          ;CLEAR REPLY CODE FIELD
LOADIV: MOV     #DRBINT,INTVEC  ;LOAD INTERRUPT VECTOR
        MOV     #340,INTVEC+2   ;PRIORITY IS 5
        .SBTTL SET-UP TIME OUT AND INITIATE DMA
        .PAGE
SETUP:  .MRKT   #TAREA,#INTRVL,#MRTN,#1 ;SET TIMER GOING (1 SECOND)
        BCC     TMRSET
        MOV     #7,@REPLY
        RTS     PC
TMRSET: MOV     #-4096.,WCR     ;WORD COUNT REGISTER
        CLR     CSR             ;CLEAR THE DRV11-B FIRST
        MOV     #DRBGO,CSR      ;FIRE UP DRV11-B
        CLR     GOFLAG
HOLDON: WAIT                    ;WAIT UNTIL DMA DONE OR TIME OUT
        TST     GOFLAG
        BEQ     HOLDON
                                ;
                                ;NOTE: WE COULD CHECK REPLY CODE
                                ;   AT THIS POINT AND ABORT THE
                                ;   UNPACK IF IT IS NOT EQUAL TO 1
                                ;
        .CMKT   #TAREA,#1               ;KILL TIMER
        .SBTTL PIXEL UNPACKING
        .PAGE
UNPACK: MOV     #8192.,R1       ;LOOP COUNTER(8192 BYTES TO BE UNPACKED)
        MOV     PIC,R2          ;PICK-UP PICTURE BUFFER ORIGIN
        ADD     R1,R2           ;R2 IS ARRAY INPUT PTR FOR PACKED PIXELS
        MOV     R2,R3           ;R3 IS ARRAY OUTPUT PTR FOR UNPACKED PIXELS
        ADD     R1,R3           ;R3 NOW 16384. OFFSET FROM BASE
LOOP:   MOVB    -(R2),R4        ;LOAD PIXEL PAIR
        MOV     R4,R5           ;COPY PAIR
        ASH     #-4,R5          ;SHIFT OVER PAIR FOR LEFT PIXEL
        BIC     #BITMSK,R5      ;THIS IS REQUIRED HERE BECAUSE
                                ;SIGN EXTEND OCCURS ON STMT 'LOOP'
        MOVB    R5,-(R3)        ;WRITE OUT UNPACKED PIXEL
        BIC     #BITMSK,R4      ;MASK OFF FOR RIGHT PIXEL
        MOVB    R4,-(R3)        ;WRITE OUT UNPACKED PIXEL
        SOB     R1,LOOP         ;LOOP FINISHED?
        RTS     PC
        .SBTTL DRV11-B INTERRUPT HANDLING
        .PAGE
        DEVPRI=5
;
DRBINT:
;
;       FOR RT-11 SJ MONITOR: JOB NUMBER ALWAYS 0
;
        .INTEN  DEVPRI          ;GO INTO SYSTEM STATE
                                ;RUN AT LEVEL 5
                                ;NOTHING CAN GO ONTO STACK UNTIL RTS
        .SYNCH  #SAREA
        BR      SFAIL
;
;       .SYNCH RETURNS HERE AT PRIORITY 0 IF SUCCESSFUL (RTI ALREADY DONE)
;       R0,R1 AVAILABLE BUT R4,R5 BUSY TILL RTS EXECUTED
;
        TST     CSR
        BGE     SUCCES
        BIT     #BIT14,CSR
        BEQ     TRY13
```

```
              MOV     #3,@REPLY
              BR      WRAPUP
TRY13:        BIT     #BIT13,CSR
              BEQ     UNKERR
              MOV     #4,@REPLY
              BR      WRAPUP
UNKERR:       MOV     #5,@REPLY
              BR      WRAPUP
SUCCES:       MOV     #1,@REPLY
WRAPUP:       CLR     CSR             ;DISABLE INTERRUPTS
              INC     GOFLAG          ;RESUME MAINLINE ROUTINE
              RTS     PC
SFAIL:        MOV     #8.,@REPLY      ;.SYNCH FAILURE
              RTS     PC
              .SBTTL  TIME OUT ERROR HANDLING
              .PAGE
MRTN:         MOV     #2,@REPLY       ;FLAG ERROR
              CLR     CSR             ;DISABLE DRV11-B INTERRUPTS
              INC     GOFLAG          ;RESUME MAINLINE ROUTINE
              RTS     PC
              .SBTTL  DATA AREA
              .PAGE
PIC:          .WORD   0               ;PICTURE INPUT BUFFER ADDRESS
REPLY:        .WORD   0               ;REPLY CODE ADDRESS
;
BITMSK=177760                         ;UNPACK MASK FOR 4 BIT FIELD
BIT14=40000
BIT13=20000
;
GOFLAG:       .WORD   0
INTRVL:       .WORD   0,60.           ;1 SECOND TIME INTERVAL / 60 TICKS
TAREA:        .BLKW   5               ;.MRKT DATA AREA
SAREA:        .WORD   0,0,0,0,5,-1,0  ;.SYNCH DATA AREA
                                      ;R0 WILL CONTAIN 5 ON SUCCESSFUL .SYNCH
                                      ;THE -1,0 IS TO PLEASE MONITOR
;
              .END    GETPIC
;             MSET.MAC
;
;             MATROX SCREEN INITIALIZATION ROUTINE
;
;             THE PURPOSE OF THIS ROUTINE IS TO SET UP THE SCROLL
;             REGISTER AND TO INITIALIZE THE ENTIRE SCREEN TO THE
;             SPECIFIED BITMSK.  IF WAIT IS NON-ZERO, THE PROGRAM
;             WILL NOT RETURN UNTIL THE DEVICE HAS COMPLETED THE
;             THE REQUESTED OPERATION.
;
;             FORTRAN CALLING SEQUENCE:
;
;                     INTEGER*2 REPLY,BITMSK,SCROLL,WAIT
;                     CALL MSET(REPLY,BITMSK,SCROLL,WAIT)
;
;             REPLY CODES:
;
;                     1: SUCCESS
;
              .PSECT  MSET,RW,I
              .IDENT  /780619/
              .GLOBL  MSET
;
;             MATROX REGISTER ASSIGNMENTS
;
              DATA=172550
              X=      172552
              Y=      172554
              SCROLL=172556
              FLAG=   172556
;
;             INITIALIZE REPLY TO GOOD
;
MSET:         MOV     #1,@2(R5)
;
;             WAIT FOR DEVICE READY
;
PAUSE:        BIT     #200,FLAG       ; IS DEVICE READY?
              BEQ     PAUSE           ;  (IF NOT, WAIT HERE)
;
;             SET SCROLL REGISTER
;
              MOV     @6(R5),SCROLL
;
;             SET SCREEN TO BITMSK
;
```

```
            MOV     @4(R5),R0               ; PICK UP BITMSK
            BIS     #100000,R0              ; MAKE SURE HIGH BIT SET
            MOV     R0,DATA                 ; WRITE TO MATROX DATA REGISTER
;
;       SHOULD WE WAIT TILL OPERATION IS COMPLETE OR RETURN NOW?
;
            TST     @8.(R5)
            BEQ     EXIT
;
;       WAIT TILL DEVICE DONE
;
LOOP:       BIT     #200,FLAG
            BEQ     LOOP
;
;       END OF ROUTINE
;
EXIT:       RTS     PC
            .END    MSET
;       MSLICE.MAC
;
;       MATROX BINARY-SLICE PICTURE DISPLAY ROUTINE
;
;       THE PURPOSE OF THIS ROUTINE IS TO DISPLAY THE
;       PICTURE STORED IN THE DATA ARRAY STARTING WITH
;       THE UPPER, LEFT CORNER DEFINED BY ELMT AND
;       LINE.  THE DATA ARRAY IS ASSUMED TO BE STORED
;       IN ROW MAJOR ORDER ON BYTE BOUNDARIES.  ALL ARRAY VALUES
;       WHICH ARE EQUAL TO WHITE WILL BE SO DISPLAYED UNLESS
;       BKGNDF IS NON-ZERO, IN WHICH CASE THE DISPLAY POLARITY
;       WILL BE REVERSED.
;
;       FORTRAN CALLING SEQUENCE:
;
;               LOGICAL*1 DATA(?,?)
;               INTEGER*2 REPLY,ELMT,LINE,ESIZE,LSIZE,WHITE,BKGNDF
;               CALL MSLICE(REPLY,ELMT,LNE,DATA,ESIZE,LSIZE,WHITE,BKGNDF)
;
;       REPLY CODES:
;
;               0:  GOOD
;
            .PSECT  MSLICE,RW,I
            .IDENT  /780620/
            .GLOBL  MSLICE
;
;       MATROX REGISTER ASSIGNMENTS
;
            DATA=   172550
            X=      172552
            Y=      172554
            SCROLL=172556
            FLAG=   172556
;
;       PICK UP ARGUMENTS
;
MSLICE:     MOV     @4(R5),R0
            ASH     #2,R0
            MOV     R0,XBEG
            MOV     @6(R5),R0
            ASL     R0
            MOV     R0,YBEG
            MOV     8.(R5),R2               ; BASE OF INPUT PICTURE
            MOV     @10.(R5),XSPAN
            MOV     @12.(R5),YSPAN
;
;       CHECK INPUT ARGUMENTS HERE...
;       SET UP GOOD REPLY CODE
;
            MOV     #1,@2(R5)
;
;       WAIT FOR DEVICE READY
;
PAUSE:      BIT     #200,FLAG
            BEQ     PAUSE
;
;       SET UP R1 FOR WHITE DISPLAY VALUE AND R0 FOR BLACK
;
            TST     @16.(R5)                ; IS BKGNDF=0?
            BEQ     ITIS
ITSNOT:     MOV     #0,R1                   ;   BKGNDF .NE. 0
            MOV     #1,R0
            BR      GOON
ITIS:       MOV     #0,R0                   ;   BKGNDF .EQ. 0
```

```
              MOV       #1,R1
GOON:
;
;         WRITE OUT PICTURE ROW BY ROW
;
              MOV       @14.(R5),R5           ; WHITE VALUE PUT INTO R5  !!!
NXTROW:  MOV       YBEG,Y                ; WRITE Y REGISTER
              MOV       XBEG,R3               ; R3 TO HOLD X REGISTER VALUE
              MOV       XSPAN,R4              ; R4 IS NXTCOL LOOP CONTROL
NXTCOL:  MOV       R3,X                  ; WRITE X REGISTER
              CMPB      (R2)+,R5              ; IS PIXEL WHITE LEVEL?
              BEQ       WHITE
BLACK:   MOV       R0,DATA               ;    (BLACK PIXEL)
              BR        CONT
WHITE:   MOV       R1,DATA               ;    (WHITE PIXEL)
CONT:    ADD       #4,R3                 ; INC TO NEXT COLUMN
              SOB       R4,NXTCOL             ; END OF NXTCOL LOOP
              ADD       #2,YBEG               ; INC TO NEXT ROW
              SUB       #1,YSPAN              ; DEC AND TEST FOR ZERO
              BNE       NXTROW                ;    (END OF ROW LOOP)
;
              RTS       PC
;
;         DATA AREA
;
XBEG:    .WORD     0
YBEG:    .WORD     0
XSPAN:   .WORD     0
YSPAN:   .WORD     0
;
              .END      MSLICE
              MVECT2.MAC
;
;         MATROX CONTINUOUS VECTOR GENERATOR -- VERSION 2
;
;         THE PURPOSE OF THIS PROGRAM IS TO GENERATE CONTINUOUS
;         VECTORS (IN SOFTWARE) BETWEEN A SEQUENCE OF 2 OR MORE
;         POINTS SPECIFIED IN MATROX COORDINATES.  THE POINTS
;         ARE DEFINED BY THE ELMT AND LINE ARRAYS.  THERE ARE
;         SIZE ENTRIES IN ALL.  ALL POINTS ALONG THE PATH ARE
;         WRITTEN USING THE SPECIFIED BITMSK.
;
;         FORTRAN CALLING SEQUENCE:
;
;                 INTEGER REPLY,ELMT(?),LINE(?),SIZE,BITMSK
;                 CALL MVECT2(REPLY,ELMT,LINE,SIZE,BITMSK)
;
;         REPLY CODES:
;
;                 1:  GOOD
;
              .PSECT    MVECT2,RW,I
              .IDENT    /780626/
              .GLOBL    MVECT2
;
;         MATROX REGISTER ASSIGNMENTS
;
              DATA=     172550
              X=        172552
              Y=        172554
              SCROLL=172556
              FLAG=     172556
;
;         ENTRY/UNPACK ARGUMENTS
;
MVECT2:  MOV       4(R5),XPTR
              MOV       6(R5),YPTR
              MOV       @8.(R5),SIZE
              ; GET BITMSK IN A MOMENT
;
;         CHECK FOR ARGUMENT VALIDITY, SET UP REPLY CODE
;
              MOV       #1,@2(R5)             ; GOOD REPLY
              MOV       @10.(R5),R5           ; R5 IS NOW BITMSK
;
;         WAIT FOR DEVICE READY
;
PAUSE:   BIT       #200,FLAG
              BEQ       PAUSE
;
;         TOP OF MAIN SEGMENT LOOP, SET UP START,STOP PTS
;
              SUB       #1,SIZE               ; (SIZE-1) SEGMENTS
```

```
SLOOP:  MOV     ∂XPTR,R0
        ADD     #2,XPTR
        MOV     R0,XS
        MOV     ∂YPTR,R0
        ADD     #2,YPTR
        MOV     R0,YS

;       R0,INDEX=0
;
        CLR     R0

;       R1,DELX=(XF-XS)
;
        MOV     ∂XPTR,R1
        SUB     XS,R1

;       IF (DELX < 0) THEN DO; INDEX=INDEX+4; DELX=-DELX; END;
;
        BGE     DXGE
        MOV     #4,R0           ; INDEX=0+4
        NEG     R1              ; R1=ABS(DELX)
DXGE:
;
;       R2,DELY=(YF-YS)
;
        MOV     ∂YPTR,R2
        SUB     YS,R2

;       IF (DELY < 0) THEN DO; INDEX=INDEX+2; DELY=-DELY; END;
;
        BGE     DYGE
        ADD     #2,R0           ; INDEX=INDEX+2
        NEG     R2              ; R2=ABS(DELY)
DYGE:
;
;       IF (ABS(DELX)-ABS(DELY) < 0) THEN DO:
;               INDEX=INDEX+1; FLIP-FLOP DELA,DELB; END;
;
        MOV     R1,R3           ; R3 IS TEMP FOR ABS(DELX)
        SUB     R2,R3           ; R3=ABS(DELX) - ABS(DELY)
        BGE     DIFGE
        INC     R0              ; INDEX=INDEX+1
        MOV     R1,R3           ; EXCHANGE R1 AND R2 USING R3 AS TEMP
        MOV     R2,R1
        MOV     R3,R2           ; R1 NOW DEL A ; R2 NOW DEL B
DIFGE:
;
;       LOAD M1X,M1Y,M2X,M2Y
;
        MOVB    M1XT(R0),R3
        MOV     R3,M1X
        MOVB    M1YT(R0),R3
        MOV     R3,M1Y
        MOVB    M2XT(R0),R3
        MOV     R3,M2X
        MOVB    M2YT(R0),R3
        MOV     R3,M2Y

;       R0,DEL = 2 * DELB - DELA
;
        ADD     R2,R2           ; R2 NOW 2*DELB
        MOV     R2,R0
        SUB     R1,R0
        ADD     R1,R1           ; R1 NOW 2* DELB

;       INITIALIZE R3=XT R4=YT XF YF
;
        MOV     ∂XPTR,R3
        ASH     #2,R3           ; XF NOW A MATROX ADDRESS
        MOV     R3,XF
        MOV     ∂YPTR,R4
        ASL     R4              ; YF NOW A MATROX ADDRESS
        MOV     R4,YF

MOV     XS,R3
        ASH     #2,R3
        MOV     YS,R4
        ASL     R4
;
        MOV     R3,X
        MOV     R4,Y
        MOV     R5,DATA         ; WRITE FIRST POINT IN SEGMENT
```

```
;
;
;       MAIN LOOP
;
;
LOOP:   CMP     XF,R3                   ; COMPARE CURRENT X POSITION TO FINAL
        BNE     STEP
        CMP     YF,R4                   ; COMPARE CURRENT Y POSITION TO FINAL
        BEQ     ENDDO
STEP:   TST     R0
        BGE     M2STEP
M1STEP: ADD     R2,R0
        ADD     M1X,R3
        ADD     M1Y,R4
        BR      PLOTPT
M2STEP: ADD     R2,R0
        SUB     R1,R0
        ADD     M2X,R3
        ADD     M2Y,R4
PLOTPT: MOV     R3,X
        MOV     R4,Y
        MOV     R5,DATA
        BR      LOOP
ENDDO:  SUB     #1,SIZE
        BLE     EXIT
        JMP     SLOOP
EXIT:   RTS     PC
;
;       DATA AREA
;
XPTR:   .WORD   0
YPTR:   .WORD   0
SIZE:   .WORD   0
XS:     .WORD   0
YS:     .WORD   0
XF:     .WORD   0
YF:     .WORD   0
M1X:    .WORD   0
M1Y:    .WORD   0
M2X:    .WORD   0
M2Y:    .WORD   0
M1XT:   .BYTE   4,0,4,0,-4,0,-4,0
M1YT:   .BYTE   0,2,0,-2,0,2,0,-2
M2XT:   .BYTE   4,4,4,4,-4,-4,-4,-4
M2YT:   .BYTE   2,2,-2,-2,2,2,-2,-2
;
        .END    MVECT2
;       MSCROL.MAC
;
;       MATROX SCROLL SEQUENCE CONTROL ROUTINE
;
;       THE PURPOSE OF THIS ROUTINE IS TO SEQUENCE THE
;       MATROX SCROLL REGISTER THROUGH A SEQUENCE OF VALUES
;       AS SPECIFIED IN THE ARRAY.  THIS OPERATION IS REPEATED
;       A TOTAL OF REPEAT TIMES.  THERE ARE DELAY TICKS
;       BETWEEN EACH REVISION OF THE SCROLL REGISTER.  NOTE THAT
;       ONE TICK IS 1/60 OF A SECOND.  ONE USE OF THIS ROUTINE
;       IS TO RAPIDLY TOGGLE THE TOP AND BOTTOM HALVES
;       OF THE SCREEN ON TOP OF EACH OTHER TO PRODUCE A
;       REGISTERED DUAL DISPLAY OF TWO RELATED PATTERNS.
;
;       FORTRAN CALLING SEQUENCE:
;
;               INTEGER REPLY,ARRAY(?),SIZE,REPEAT,DELAY
;               CALL MSCROL(REPLY,ARRAY,SIZE,REPEAT,DELAY
;
;       REPLY CODES:
;
;               1:  GOOD
;
        .PSECT  MSCROL,RW,I
        .IDENT  /780619/
        .GLOBL  MSCROL
;
;       REGISTER ASSIGNMENT
;
        SCROLL=172556
;
;       DO IT
;
MSCROL: MOV     #1,@2(R5)                ; GOOD REPLY CODE
        MOV     4(R5),BASE               ; STORE BASE OF ARRAY
```

```
         MOV     J6(R5),R1            ; SIZE
         MOV     J8,(R5),R2           ; REPEAT
         MOV     J10,(R5),R3          ; DELAY
;
REPEAT:  MOV     R1,R4                ; COPY SIZE TO TEMP
         MOV     BASE,R5              ; SET UP ADDRESS TO SCROLL VALUES
INNER:   MOV     R3,R0                ; COPY DELAY TO TEMP
DELAY:   WAIT                         ; WAIT FOR A CLOCK TICK
         SOB     R0,DELAY             ;  (REPEAT DELAY TIMES)
;
         MOV     (R5)+,SCROLL         ; RESET SCROLL REGISTER
;
         SOB     R4,INNER
         SOB     R2,REPEAT
;
         RTS     PC
;
;        DATA AREA
;
BASE:    .WORD   0
         .END    MSCROL
```

The embodiments of the invention in which an exclusive property or privilege is claimed are defined as follows:

1. A method of automatically determining the strain induced in a sheet metal sample by a forming operation, said sample having a grid of circles of predetermining diameter printed thereon prior to said operation, which circles are stretched into patterns of generally elliptical shape as a result of said operation, said method comprising the steps of:

obtaining a digital representation of the image of a portion of the sample including at least one of said patterns, which digital representation is a sequence of integers, each integer corresponding to the average light intensity of the image at discrete image element locations, storing said integers in addressable locations in the memory of a digital computer, said computer being programmed to perform the steps of:

(a) segmenting the image into binary regions, one region type comprising contiguous image elements whose light intensity levels are less than a threshold level and the other region type comprising contiguous image elements whose light intensity levels are equal to or greater than said threshold level;

(b) identifying a plurality of points residing on the boundary of one region type which is totally within the field or view defined by the image and which is greater than a predetermined size;

(c) fitting an ellipse to said points;

(d) calculating a diameter of the fitted ellipse and;

(e) calculating the strain induced in the sample as a function of said calculated diameter and the predetermined diameter of said circles.

2. A method of automatically determining the strain induced in a sheet metal sample by a forming operation, said sample having a grid of circles of predetermining diameter printed thereon prior to said operation, which circles are stretched into patterns of generally elliptical shape as a result of said operation, said method comprising the steps of:

obtaining a digital representation of the image of a portion of the sample including at least one of said patterns, which digital representation is a sequence of integers, each integer corresponding to the average light intensity of the image at discrete image element locations, storing said integers in addressable locations in the memory of a digital computer, said computer being programmed to perform the steps of:

(a) segmenting the image into binary regions, one region type comprising contiguous image elements whose light intensity levels are less than a threshold level and the other region type comprising contiguous image elements whose light intensity levels are equal to or greater than said threshold level;

(b) identifying a plurality of points residing on the boundary of one region type which is totally within the field of view defined by the image and which is greater than a predetermined size;

(c) fitting an ellipse to said points;

(d) calculating the distance between two of said points lying on one of the axes of the fitted ellipse and;

(e) calculating the strain induced in the sample as a function of said distance and the predetermined diameter of said circles.

3. A method of automatically determining the strain induced in a sheet metal sample by a forming operation, said sample having a grid of circles of predetermining diameter printed thereon prior to said operation, which circles are stretched into patterns of generally elliptical shape as a result of said operation, said method comprising the steps of:

obtaining a digital representation of the image of a portion of the sample including at least one of said patterns, which digital representation is a sequence of integers, each integer corresponding to the average light intensity of the image at discrete identified image element locations, storing said integers in addressable locations in the memory of a digital computer, said computer being programmed to perform the steps of:

(a) determining from selected groups of said integer values a threshold level of light intensity which is a gradient-weighted average light intensity in transition areas of the image where the gradient of light intensity exceeds a predetermined value;

(b) segmenting the image into binary regions, one region type comprising contiguous image elements whose light intensity levels are less than said weighted average and the other region type comprising contiguous image elements whose light intensity levels are equal to or greater than said weighted average;

(c) identifying the location of a plurality of points residing on the boundary of one region which is totally within the field of view defined by the image and is greater than a predetermined size;
(d) fitting an ellipse to said points;
(e) identifying those points within a predetermined tolerance distance from the fitted ellipse and refitting an ellipse to the points so identified, reducing said tolerance distance and repeating this step (e) a predetermined number of times or until a predetermined root-mean-square percent error is attained;
(f) calculating at least one of the major and minor diameters of the ellipse fitted in step (e) and;
(g) calculating the strain induced in the sample as a function of the calculated diameter and the predetermined diameter of said circles.

4. Apparatus for automatically determining the strain induced in a sheet metal sample by a forming operation, said sample having a grid of circles of predetermining diameter printed thereon prior to said operation, which circles are stretched into patterns of generally elliptical shape as a result of said operation, said apparatus comprising:

means for obtaining a digital representation of the average light intensity of discrete elements of the image of a portion of the sample including at least one of said patterns;

digital computer means for storing said digital representation in addressable memory locations, said computer being programmed to:
(a) determine a threshold level of light intensity which is a gradient-weighted average light intensity in transition areas of the image where the gradient of light intensity exceeds a predetermined value;
(b) segment the image into binary regions, one region type comprising contiguous image elements whose light intensity levels are less than said threshold and the other region type comprising contiguous image elements whose light intensity levels are equal to or greater than said threshold;
(c) identify a plurality of points residing on the boundary of one region type which is totally within the field of view defined by the image and is greater than a predetermined size;
(d) fit an ellipse to said points;
(e) identify those points within a predetermined tolerance distance from the fitted ellipse and refit an ellipse to the points so identified, reduce said tolerance distance and repeat this step (e) a predetermined number of times or until a predetermined root-mean-square percent error is attained;
(f) calculate at least one of the diameters of the fitted ellipse and;
(g) calculate the strain induced in the sample as a function of the calculated diameter and the predetermined diameter of said circles.

5. Apparatus for automatically determining the strain induced in a sheet metal sample by a forming operation, said sample having a grid of circles of predetermining diameter printed thereon prior to said operation, which circles are stretched into patterns of generally elliptical shape as a result of said operation, said apparatus comprising:

means for obtaining a digital representation of the average light intensity of discrete elements of the image of a portion of the sample including at least one of said patterns;

digital computer means for storing said digital representation in addressable memory locations, said computer being programmed to:
(a) segment the image into binary regions, one region type comprising contiguous image elements whose light intensity levels are less than a threshold and the other region type comprising contiguous image elements whose light intensity levels are equal to or greater than a threshold;
(b) identify a plurality of points residing on the boundary of one region type which is totally within the field of view defined by the image and is greater than a predetermined size;
(c) fit an ellipse to said points;
(d) calculate at least one of the diameters of the fitted ellipse and;
(e) calculate the strain induced in the sample as a function of the calculated diameter and the predetermined diameter of said circles.

* * * * *